(12) United States Patent
Negishi et al.

(10) Patent No.: US 10,738,064 B2
(45) Date of Patent: Aug. 11, 2020

(54) CHIRAL α-AMINO TERTIARY BORONIC ESTERS

(71) Applicant: Purdue Research Foundation, West Lafayette, IN (US)

(72) Inventors: Ei-ichi Negishi, West Lafayette, IN (US); Shiqing Xu, West Lafayette, IN (US); Qingqing Qi, West Lafayette, IN (US); Xuena Yang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/519,037

(22) Filed: Jul. 23, 2019

(65) Prior Publication Data
US 2020/0079799 A1 Mar. 12, 2020

Related U.S. Application Data

(60) Provisional application No. 62/728,101, filed on Sep. 7, 2018.

(51) Int. Cl.
C07F 5/04 (2006.01)
C07B 53/00 (2006.01)
(52) U.S. Cl.
CPC ............... *C07F 5/04* (2013.01); *C07B 53/00* (2013.01)

(58) Field of Classification Search
None
See application file for complete search history.

(56) References Cited

PUBLICATIONS

Buesking, Andrew W., et al., Asymmetric Synthesis of Protected α-Amino Boronic Acid Derivatives with an Air- and Moisture-Stable Cu(II) Catalyst. J. Org. Chem., 2014, 79, 8, 3671-3677.
Hu, Naifu et al., Synthesis of Chiral α-Amino Tertiary Boronic Esters by Enantioselective Hydroboration of α-Arylenamides. J. Am. Chem. Soc., 2015, 137, 21, 6746-6749.
Panda Santanu et al., Palladium Catalyzed Asymmetric Three-Component Coupling of Boronic Esters, Indoles, and Allylic Acetates. J. Am. Chem. Soc., 2017, 139, 17, 6038-6041.
Das Saikat et al., Lewis Acid Catalyzed Stereoselective Dearomative Coupling of Indolylboron Ate Complexes with Donor-Acceptor Cyclopropanes and Alkyl Halides. Angew. Chem. Int. Ed. 2018, 57, 4053-4057.

*Primary Examiner* — Samantha L Shterengarts
(74) *Attorney, Agent, or Firm* — Purdue Research Foundation; Zhigang Rao

(57) ABSTRACT

The present disclosure relates to a novel, highly efficient and enantiospecific borylation method to synthesize a wide range of enantiopure alfa-amino tertiary boronic esters, and novel alfa-amino tertiary boronic acids and esters prepared by the method. More specifically, highly enantiospecific borylation of configurationally stable α-N-Boc substituted tertiary organolithium species and HBpin has been developed to synthesize various alfa-amino tertiary boronic esters through the formation of a new C—B bond with excellent enantiopurities.

17 Claims, No Drawings

CHIRAL α-AMINO TERTIARY BORONIC ESTERS

CROSS-REFERENCE TO RELATED APPLICATION

This application claims the benefits of U.S. Provisional Application Ser. No. 62/728,101, filed Sep. 7, 2018, the contents of which are incorporated herein entirely.

TECHNICAL FIELD

The present disclosure relates to a novel, highly efficient and enantiospecific borylation method to synthesize a wide range of enantiopure α-amino tertiary boronic esters, and novel α-amino tertiary boronic acids and esters prepared by the method.

BACKGROUND

This section introduces aspects that may help facilitate a better understanding of the disclosure. Accordingly, these statements are to be read in this light and are not to be understood as admissions about what is or is not prior art.

Chiral boronic acids and their derivatives are highly versatile building blocks in modern asymmetric synthesis. Their stereospecific conversion into a broad range of useful functional groups is a continually growing and important research area. Additionally, many unique biological activities of boron-containing compounds have been revealed. Among them, chiral α(alfa)-aminoboronic acids have received significant attention since they are the key pharmacophores in protease inhibitions such as Bortezomib (Velcade, an anti-cancer drug and the first therapeutic proteasome inhibitor) and Ixazomib (Ninlaro, a drug for the treatment of multiple myeloma). In addition, many other α-aminoboronic acid compounds showed excellent anticancer, antiviral, and antibacterial activities. From the success of these compounds, there has been an increased interest in searching α-amino boronate-containing small bioactive molecules (FIG. 1).

Figure 1. Examples of α-aminoboronate drugs and biologically active molecules

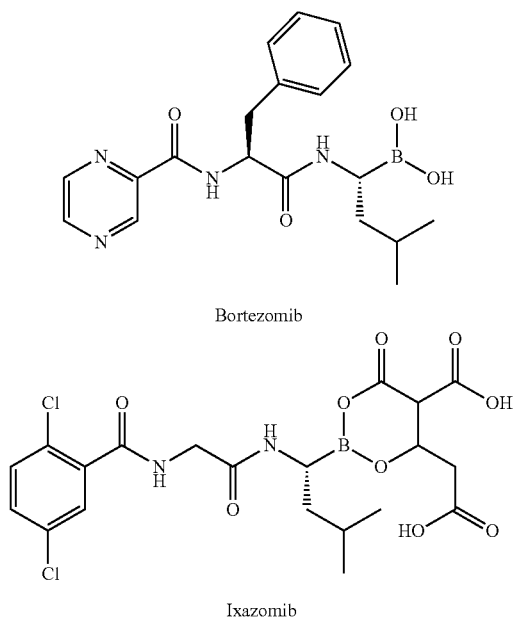

Bortezomib

Ixazomib

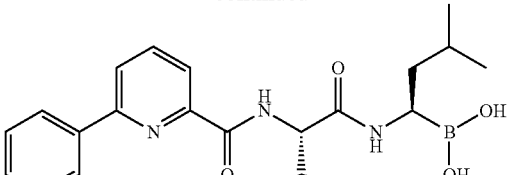

Delanzomib

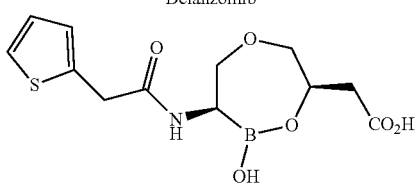

Vabomere

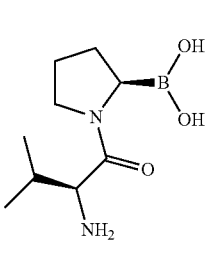

Talabostat

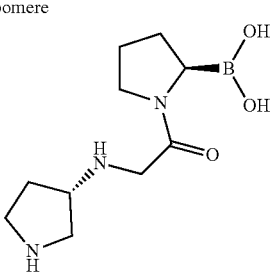

Dutogliptin

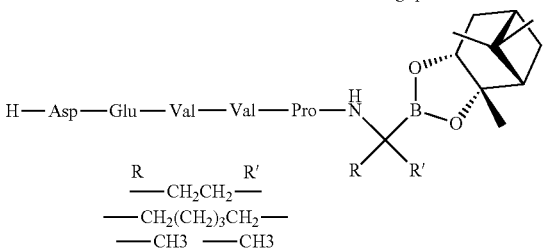

In view of their broad biological activities, substantial efforts have been made to develop synthetic methods for the asymmetric construction of α-aminoboronic acids and their derivatives. Previous approaches by either use of chiral auxiliaries or asymmetric catalytic transformations have been utilized for the efficient preparation of a variety of α-aminoboronic acid derivatives, whereas they mainly limited to the construction of chiral α-amino secondary boronic esters.

Indeed, there have been only a limited number of reports on asymmetric approaches to more sterically congested α-amino tertiary boronic esters, which involves a particular challenge for the stereoselective construction of N-substituted quaternary carbon stereogenic centers (Scheme 1). For example, significant lower enantioselectivity was observed for the synthesis sterically hindered α-amino tertiary boronic esters compared to secondary boronic esters by borylation of imines and Cu-catalyzed hydroamination of alkenyl dan-boronates. Recently, Ellman reported a copper-catalyzed diastereoselective borylation of chiral N-tert-butanesufinyl ketimines with involvement of a chiral auxiliary (Scheme 1, eq 1). See A. W. Buesking, V. Bacauanu, I. Cai, J. A. Ellman, *J. Org. Chem.* 2014, 79, 3671-3677. In another approach, Tang described an elegant enantiospecific synthesis of N-substituted quaternary α-aminoboronic esters by rhodium-catalyzed hydroboration of α-arylenamides (Scheme 1, eq 2). See N. Hu, G. Zhao, Y. Zhang, X. Liu, G. Li, W. Tang, *J. Am. Chem. Soc.* 2015, 137, 6746-6749. Very recently, Ready and Studer developed transition-metal catalyzed enantiospecific and diastereoselective multi-component coupling involving indolylboron ate complexes to provide α-substituted indoline boronic esters, respectively (Scheme 1, eq 3 and eq 4). See S. Panda, J. M. Ready, *J. Am. Chem. Soc.* 2017, 139, 6038-6041; b) S. Das, C. G. Daniliuc, A. Studer, *Angew. Chem. Int. Ed.* 2018, 57, 4053-4057.

Despite recent progress, there remains a great challenge for the synthesis of N-substituted quaternary α-aminoboronic esters with high enantiopurity in a general manner.

SUMMARY

The present disclosure provides a novel, highly efficient and enantiospecific borylation method to synthesize a wide range of α-amino tertiary boronic esters, and novel α-amino tertiary boronic esters prepared by the method. This novel Scheme 1. Prior art asymmetric approaches to α-amino tertiary boronic esters Previous work

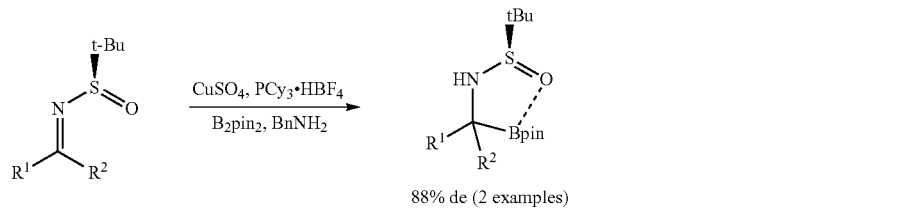

(1)

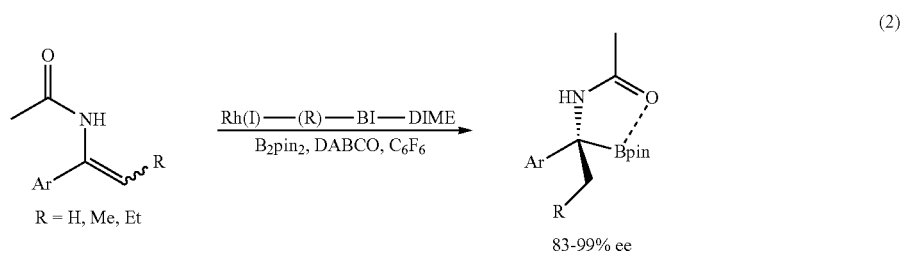

(2)

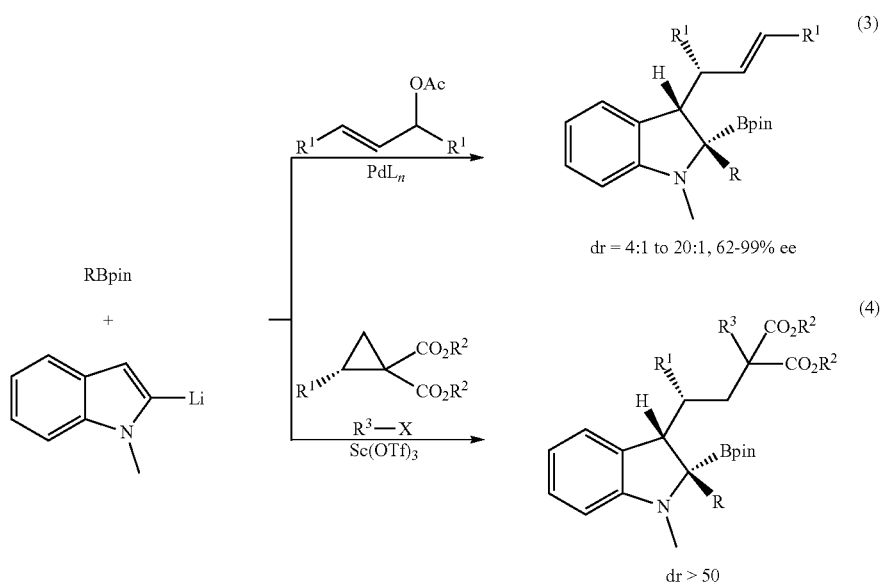

method provides an unexpectedly high enantiopure (>99% ee) α-amino tertiary boronic esters. The general method can be illustrated with Scheme 2. The group "DG" represents to a suitable electron-withdrawing group such as a Boc or sulfonyl group.

Scheme 2. Novel asymmetric approaches to α-amino tertiary boronic esters

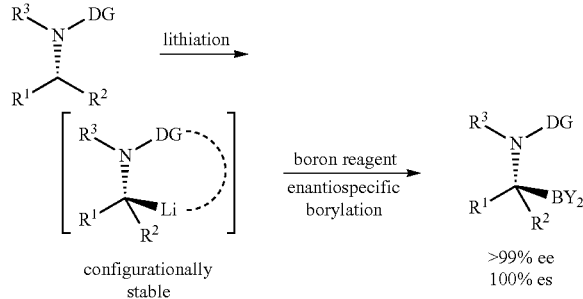

In one embodiment, the present disclosure provides a method of making a chiral α-amino tertiary boronic compound of formula (I) or any pharmaceutically acceptable salt or isomer thereof, wherein the method comprises:
  a) converting a compound of formula (III) to a compound of formula (II) by reacting the compound of formula (III) with a lithiation reagent $LiR^7$;
  b) converting the compound of formula (II) to the compound of formula (I) by reacting the compound of formula (II) with a boron reagent $B(OR^4)(OR^5)R^6$,

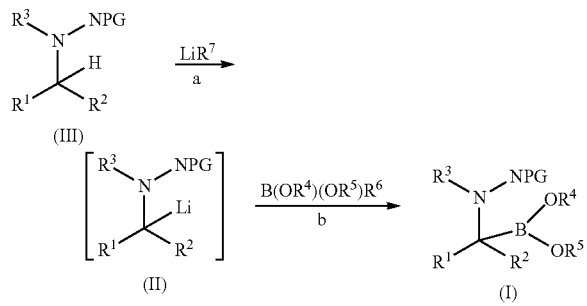

wherein:
  $R^1$, $R^2$ and $R^3$ are each individually non-hydrogen groups, and wherein $R^1$ and $R^2$ are different groups;
  $R^4$ and $R^5$ are each individually H, $R^4$ and $R^5$ are each individually straight or branched optionally substituted $C_1$-$C_{12}$ alkyl group, wherein $R^4$ and $R^5$ may form a cyclic ring, or $(OR^4)$,$(OR^5)$, and B together form a fused ring

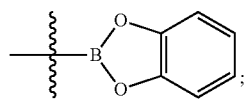 [SMILES: *B1Oc2ccccc2O1]

$R^6$ is H, a straight or a branched optionally substituted $C_1$-$C_{12}$ alkoxyl group;
  $R^7$ is an optionally substituted aryl, or a straight or branched optionally substituted $C_1$-$C_{12}$ alkyl group, wherein the $C_1$-$C_{12}$ alkyl is optionally interspersed at one or more intervals with one or more heteroatom selected from the group consisting of N and Si; and
  NPG is a nitrogen protecting group.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

The term "substituted" as used herein refers to a functional group in which one or more hydrogen atoms contained therein are replaced by one or more non-hydrogen atoms. The term "functional group" or "substituent" as used herein refers to a group that can be or is substituted onto a molecule. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo (carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, azides, hydroxylamines, cyano, nitro groups, N-oxides, hydrazides, and enamines; and other heteroatoms in various other groups.

Non-limiting examples of substituents, that can be bonded to a substituted carbon (or other such as nitrogen) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, (CH$_2$)$_{0-2}$P(O)OR$_2$, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)C(O)OR, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted; or wherein two R groups bonded to a nitrogen atom or to adjacent nitrogen atoms can together with the nitrogen atom or atoms form a heterocyclyl, which can be mono- or independently multi-substituted.

The term "aryl" as used herein refers to substituted or unsubstituted cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons ($C_6$-$C_{14}$) or from 6 to 10 carbon atoms ($C_6$-$C_{10}$) in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

A "hetero aryl" represents aromatic ring comprising at least one hetero atom such as N, S, O, or Se. Hetero aryl in the present disclosure may be any hetero aryl. Hetero aryl in the present disclosure may be but is not limited to pyrrolidinyl, azetidinyl, piperidynyl, piperazinyl, morpholinyl, chromanyl, indolinonyl, isoindolinonyl, furanyl, pyrrolidinyl, pyridinyl, pyrazinyl, pyrimidinyl, triazinyl, thiophenyl, tetrahydrofuranyl, pyrrolyl, oxazolyl, oxadiazolyl, imidazolyl, triazyolyl, tetrazolyl, benzoxazolinyl, benzthiazolinyl, benzimidazolinyl groups, or any combination thereof.

The terms "halo," "halogen," or "halide" group, as used herein, by themselves or as part of another substituent, mean, unless otherwise stated, a fluorine, chlorine, bromine, or iodine atom.

The compounds described herein may refer more than one "isomer" that may contain one or more chiral centers, or may otherwise be capable of existing as multiple stereoisomers. It is to be understood that in one embodiment, the invention described herein is not limited to any particular stereochemical requirement, and that the compounds, and compositions, methods, uses, and medicaments that include them may be optically pure, or may be any of a variety of stereoisomeric mixtures, including racemic and other mixtures of enantiomers, other mixtures of diastereomers, and the like. It is also to be understood that such mixtures of stereoisomers may include a single stereochemical configuration at one or more chiral centers, while including mixtures of stereochemical configuration at one or more other chiral centers.

Similarly, the compounds described herein may include geometric centers, such as cis, trans, E, and Z double bonds. It is to be understood that in another embodiment, the invention described herein is not limited to any particular geometric isomer requirement, and that the compounds, and compositions, methods, uses, and medicaments that include them may be pure, or may be any of a variety of geometric isomer mixtures. It is also to be understood that such mixtures of geometric isomers may include a single configuration at one or more double bonds, while including mixtures of geometry at one or more other double bonds.

The term "ee" (enantiomeric excess) is a measurement of purity used for chiral substances. It reflects the degree to which a sample contains one enantiomer in greater amounts than the other. A racemic mixture has an ee of 0%, while a single completely pure enantiomer has an ee of 100%. A sample with 70% of one enantiomer and 30% of the other has an ee of 40% (70%-30%).

The term "optionally substituted," or "optional substituents," as used herein, means that the groups in question are either unsubstituted or substituted with one or more of the non-limiting substituents including, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, azides, hydroxylamines, cyano, nitro groups, N-oxides, hydrazides, and enamines; and other heteroatoms in various other groups. When the groups in question are substituted with more than one substituent, the substituents may be the same or different. When using the terms "independently," "independently are," and "independently selected from" mean that the groups in question may be the same or different. Certain of the herein defined terms may occur more than once in the structure, and upon such occurrence each term shall be defined independently of the other.

As used herein, the term "nitrogen protecting group" in the present disclosure may be any functional group that can make the amine nitrogen to be protected as any form of carbamate, benzyl amine, amide, thioamide, sulfonamide, urea, or thiourea. The nitrogen protecting group may include but is not limited to benzoyl, benzyloxycarbonyl, t-butoxycarbonyl, benzene sulfonyl, toluene sulfonyl, benzyl, benzhydryl, trityl, acetyl, —CON($^i$Pr)$_2$, or trifluoroacetyl.

In one embodiment, the present disclosure provides a method of making a chiral α-amino tertiary boronic compound of formula (I) or any pharmaceutically acceptable salt or isomer thereof, wherein the method comprises:
a) converting a compound of formula (III) to a compound of formula (II) by reacting the compound of formula (III) with a lithiation reagent LiR$^7$;
b) converting the compound of formula (II) to the compound of formula (I) by reacting the compound of formula (II) with a boron reagent B(OR$^4$)(OR$^5$)R$^6$,

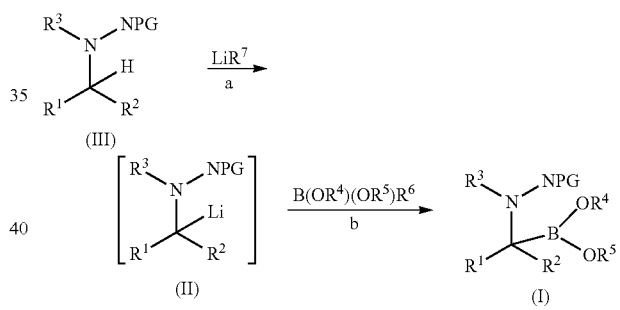

wherein:
R$^1$, R$^2$ and R$^3$ are each individually non-hydrogen groups, and wherein R$^1$ and R$^2$ are different groups;
R$^4$ and R$^5$ are each individually H, R$^4$ and R$^5$ are each individually straight or branched optionally substituted $C_1$-$C_{12}$ alkyl group, wherein R$^4$ and R$^5$ may form a cyclic ring, or (OR$^4$), (OR$^5$), and B together form a fused ring

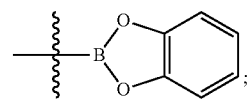 [SMILES: *B1Oc2ccccc2O1]

R$^6$ is H, a straight or a branched optionally substituted $C_1$-$C_{12}$ alkoxyl group;
R$^7$ is an optionally substituted aryl, or a straight or branched optionally substituted $C_1$-$C_{12}$ alkyl group, wherein the $C_1$-$C_{12}$ alkyl is optionally interspersed at one or more intervals with one or more heteroatom selected from the group consisting of N and Si; and
NPG is a nitrogen protecting group.

In one embodiment, the present disclosure provides a method of making a chiral α-amino tertiary boronic compound of formula (I) or any pharmaceutically acceptable salt or isomer thereof, wherein $R^1$, $R^2$ and $R^3$ are each individually non-hydrogen groups, and wherein $R^1$ and $R^2$ are different groups; and wherein $R^1$, $R^2$ and $R^3$ are each individually different straight or branched optionally substituted $C_1$-$C_{12}$ alkyl group, optionally substituted $C_3$-$C_{12}$ cycloalkyl group, optionally substituted $C_3$-$C_{12}$ cycloalkenyl group, straight or branched optionally substituted $C_2$-$C_{12}$ alkenyl group, straight or branched optionally substituted $C_2$-$C_{12}$ alkynyl group, optionally substituted $C_6$-$C_{12}$ aryl, optionally substituted $C_6$-$C_{12}$ heteroaryl with one or more O, N, or S, wherein $R^1$ and $R^2$, $R^1$ and $R^3$, or $R^2$ and $R^3$ may jointly form an optionally substituted $C_3$-$C_8$ saturated or non-saturated ring, or form an optionally substituted $C_3$-$C_8$ saturated or non-saturated heterocyclic ring.

In one embodiment, the present disclosure provides a method of making a chiral α-amino tertiary boronic compound of formula (I) or any pharmaceutically acceptable salt or isomer thereof, wherein $B(OR^4)(OR^5)R^6$ is $B(OMe)_3$, catecholborane, or 4,4,5,5-tetramethyl-1,3,2-dioxaborolane (HBpin), 2-methoxy-4,4,5,5-tetramethyl-1,3,2-dioxaborolane (MeO-Bpin).

In one embodiment, the present disclosure provides a method of making a chiral α-amino tertiary boronic compound of formula (I) or any pharmaceutically acceptable salt or isomer thereof, wherein the NPG is a nitrogen protecting group that has a carbonyl (C=O) group, a sulfinyl group ((S=O), or a sulfonyl (—SO₂)— group directly attached to the nitrogen to be protected.

In one embodiment, the present disclosure provides a method of making a chiral α-amino tertiary boronic compound of formula (I) or any pharmaceutically acceptable salt or isomer thereof, wherein the NPG is tert-butyloxycarbonyl (Boc) or CON(ⁱPr)₂.

In one embodiment, the present disclosure provides a method of making a chiral α-amino tertiary boronic compound of formula (I) or any pharmaceutically acceptable salt or isomer thereof, wherein $R^7$ of $LiR^7$ is a phenyl, or a straight or branched butyl group. In one aspect, $LiR^7$ is lithium diisopropylamide (LDA) or lithium bis(trimethylsilyl)amide (LHMDS).

In one embodiment, the present disclosure provides a method of making a chiral α-amino tertiary boronic compound of formula (I) or any pharmaceutically acceptable salt or isomer thereof, wherein the method is capable of providing the compound of formula (I) an ee value of 60-100%, 70-100%, 80-100%, 90-100%, 95-100%, 96-100%, 97-100%, 98-100%, or 99-100%.

In one embodiment, the present disclosure provides a method of making a chiral α-amino tertiary boronic compound of formula (I) or any pharmaceutically acceptable salt or isomer thereof, wherein NPG is a BOC or CON(ⁱPr)₂ group, $R^7$ is straight or branched butyl group, lithium diisopropylamide (LDA), or lithium bis(trimethylsilyl)amide (LHMDS), $B(OR^4)(OR^5)R^6$ is $B(OMe)_3$ or 4,4,5,5-tetramethyl-1,3,2-dioxaborolane.

In one embodiment, the present disclosure provides a compound of formula (I):

(I)

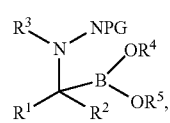

or any pharmaceutically acceptable salt or isomer thereof, wherein $R^1$, $R^2$ and $R^3$ are each individually non-hydrogen groups, and wherein $R^1$ and $R^2$ are different groups, wherein $R^1$ and $R^2$, $R^1$ and $R^3$, or $R^2$ and $R^3$ may jointly form an optionally substituted $C_3$-$C_8$ saturated or non-saturated ring, or form an optionally substituted $C_3$-$C_8$ saturated or non-saturated heterocyclic ring; $R^4$ and $R^5$ are each individually H, $R^4$ and $R^5$ are each individually straight or branched optionally substituted $C_1$-$C_{12}$ alkyl group, wherein $R^4$ and $R^5$ may jointly form a cyclic ring, or $(OR^4),(OR^5)$, and B together form a fused ring

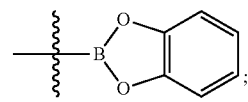 [SMILES: *B1Oc2ccccc2O1]

and NPG is a nitrogen protecting group.

In one embodiment, the present disclosure provides a compound of formula (I) or any pharmaceutically acceptable salt or isomer thereof, wherein wherein $R^1$, $R^2$ and $R^3$ are each individually different straight or branched optionally substituted $C_1$-$C_{12}$ alkyl group, optionally substituted $C_3$-$C_{12}$ cycloalkyl group, optionally substituted $C_3$-$C_{12}$ cycloalkenyl group, straight or branched optionally substituted $C_2$-$C_{12}$ alkenyl group, straight or branched optionally substituted $C_2$-$C_{12}$ alkynyl group, optionally substituted $C_6$-$C_{12}$ aryl, optionally substituted $C_6$-$C_{12}$ heteroaryl with one or more O, N, or S.

In one embodiment, the present disclosure provides a compound of formula (I) or any pharmaceutically acceptable salt or isomer thereof, wherein the compound has a formula (I') or formula (I"):

(I')

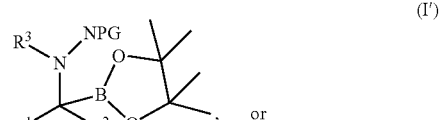

or (I")

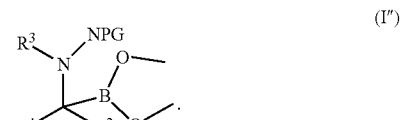

In one embodiment, the present disclosure provides a compound of formula (I) or any pharmaceutically acceptable salt or isomer thereof, wherein the NPG is a nitrogen protecting group that has a carbonyl (C=O) group, a sulfinyl group ((S=O), or a sulfonyl (—SO₂)— group directly attached to the nitrogen to be protected.

In one embodiment, the present disclosure provides a compound of formula (I) or any pharmaceutically acceptable salt or isomer thereof, formula (I') or formula (I"), wherein the NPG is tert-butyloxycarbonyl (Boc) or CON(ⁱPr)₂.

In one embodiment, the present disclosure provides a compound of formula (I) or any pharmaceutically acceptable salt or isomer thereof, formula (I') or formula (I") or any pharmaceutically acceptable salt or isomer thereof, wherein the compound has an ee value of 90-100%.

In one embodiment, the present disclosure provides a compound of formula (I), wherein the compound is selected from the group consisting of:

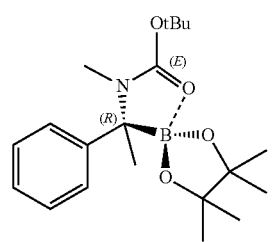 2a
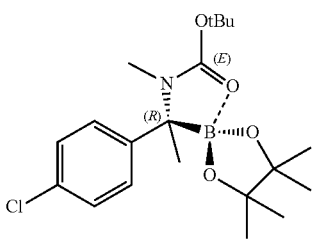 2b
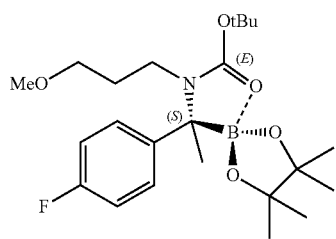 2c
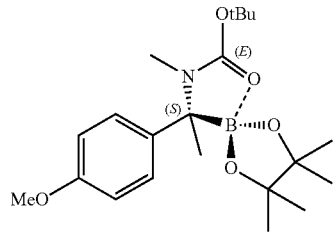 2d
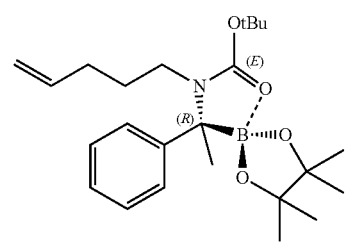 2e
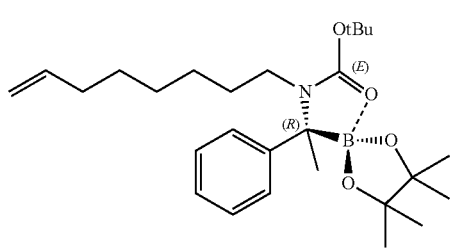 2f
-continued
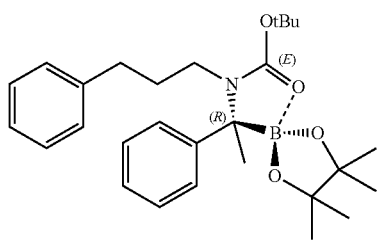 2g
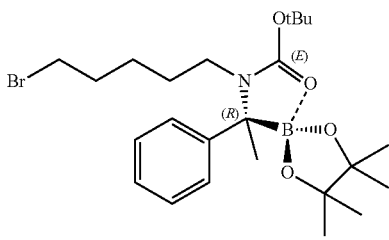 2h
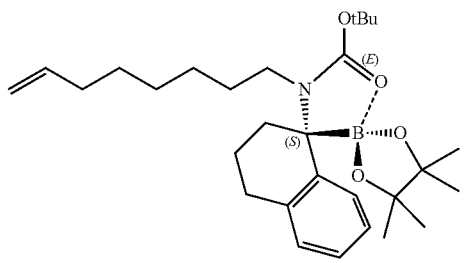 2i
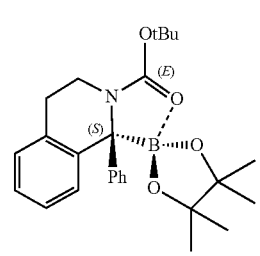 2j
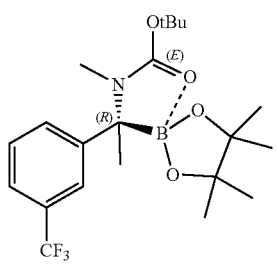 2k
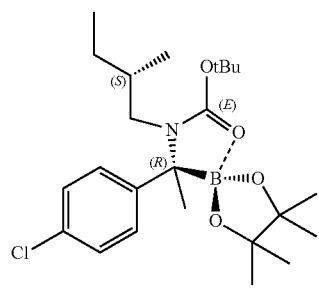 3a

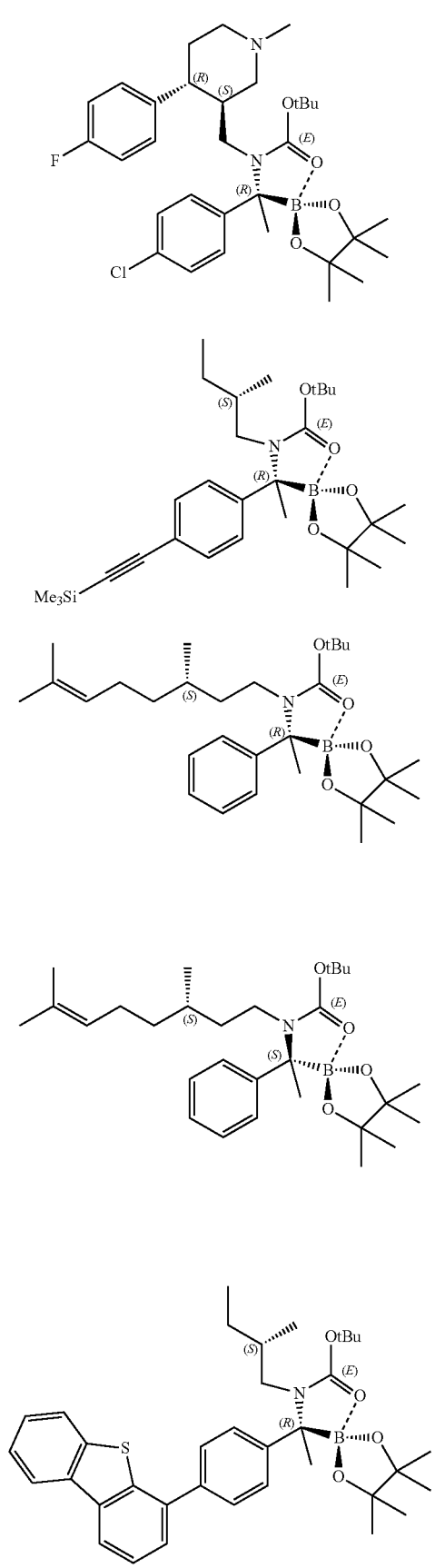
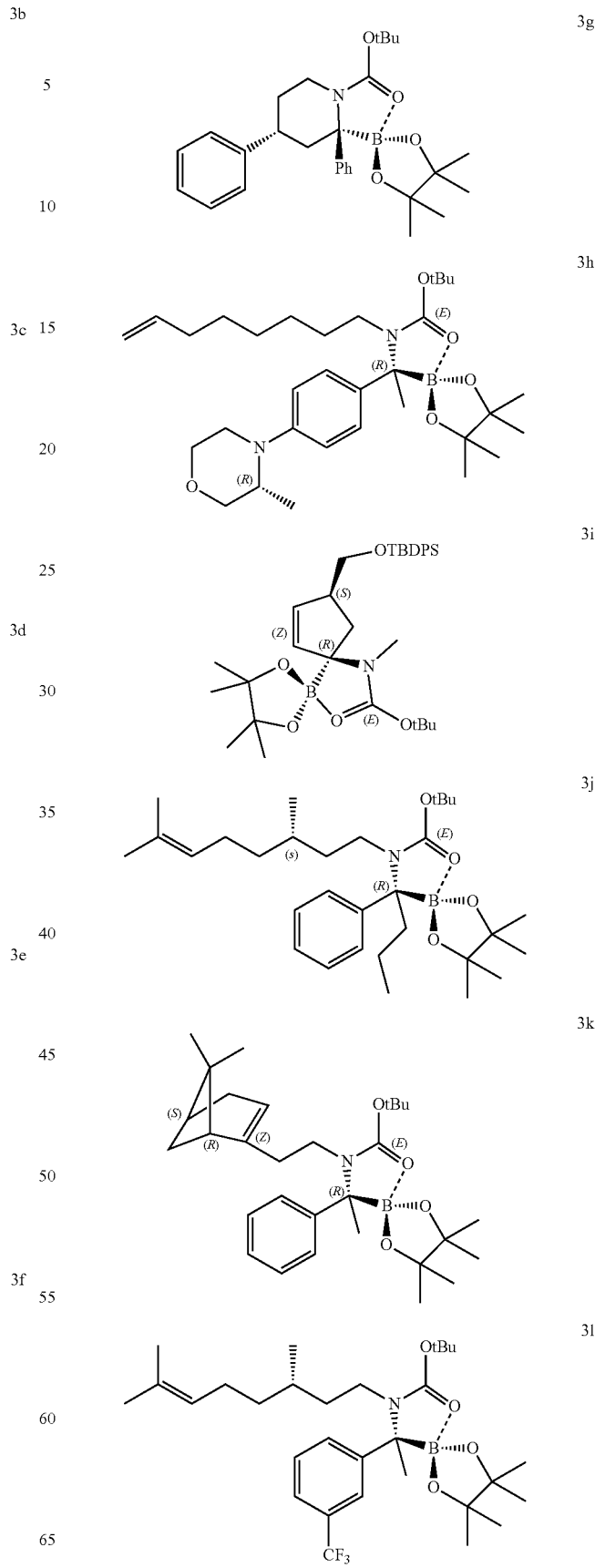

-continued

4

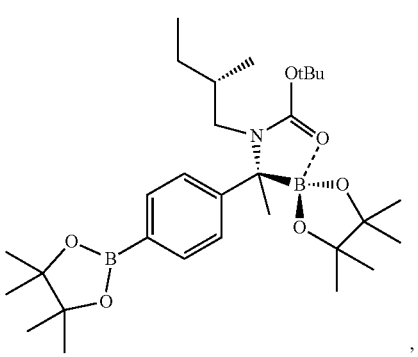

5

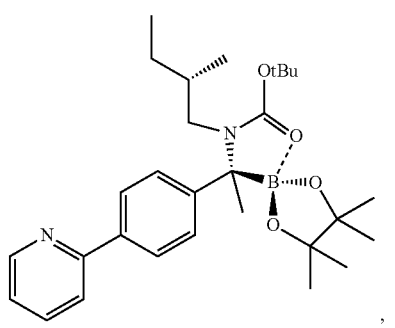

6

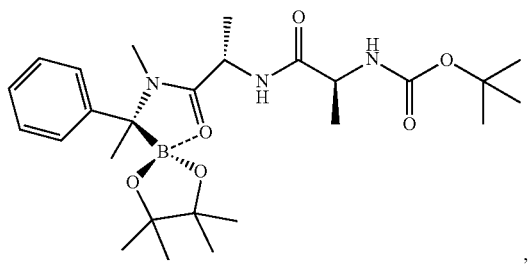

any boronic acid obtained through hydrolosis of boronic ester, pharmaceutically acceptable salt, and isomer thereof.

In one embodiment, the present disclosure provides that the ratio of the equivalence of boron reagent $B(OR^4)(OR^5)R^6$ to the equivalence of the starting material compound of formula (III) is about 0.5 to 3.0, 0.5 to 2.5, 0.5 to 2.0, 0.5 to 1.5, 1.0 to 3.0, 1.0 to 2.5, 1.0 to 2.0, 1.0 to 1.5. A preferred ratio is about 1.0-1.5 to achieve the best ee value.

Experimental Sections

To check the feasibility of the strategy as illustrated in Scheme 2, N-Boc-N-methyl-1-phenylethanamine 1 as the standard substrate was used for screening enantiospecific borylation (Table 1).

TABLE 1

Optimization of the enantiospecific borylation

| Entry | DG | Boron reagent | Borylation condition | Yield [%][a] | ee [%][b] |
|---|---|---|---|---|---|
| 1 | Boc | iPrOBpin | −78° C., 2.5 h | <2 | — |
| 2 | Boc | iPrOBpin | −78 to 23° C. slowly in 12 h | 55 | 80 |
| 3 | Boc | MeOBpin | −78° C., 2 h | <2 | — |
| 4 | Boc | MeOBpin | −78 to 23° C. slowly in 12 h | 56 | 88 |
| 5 | Boc | B(OMe)$_3$ | −78° C., 2.5 h | 75[c] | 80[d] |
| 6 | Boc | B(OMe)$_3$ | −78° C., 2.5 h | 60[e] | 80[d] |
| 7 | Boc | HBpin | −78° C., 2.5 h | 99 | >99 |
| 8 | Boc | HBcat | −78° C., 2.5 h | 28 | — |
| 9 | CON($^i$Pr)$_2$ | HBpin | −78° C., 2.5 h | 80 | 97 |

[a]Isolated yields.
[b]Determined by HPLC-analysis on chiral stationary phase.
[c]Determined by crude 1H NMR analysis.
[d]Determined by HPLC-analysis on chiral stationary phase of the corresponding pinacol boronic ester.
[e]The product was the corresponding boronic acid after quenching with H$_2$O or aqueous HCl.
HBpin: 4,4,5,5-tetramethyl-1,3,2-dioxaborolane.
HBcat: catecholborane
Boc: tert-butyloxycarbonyl The lithiation of 1 using sec-BuLi at −78° C. was completed in 30 min to generate the corresponding organo-lithium species. Then various conditions for the enantiospecific borylation of α-lithiated tertiary N-benzylic carbamate were examined. The investigation was initiated by using iPrOBpin and MeOBpin as borylation reagents, but no borylation occurred at −78° C. (Table 1, entries 1 and 3). To facilitate the borylation, the reaction was carried out initially at −78° C. and slowly increased the reaction temperature to 23° C. in 12 h. In these cases, the desired borylated product 2 (DG=Boc) was obtained in 55% and 56% yield, but only in 80% ee and 88% ee, respectively (Table 1, entries 2 and 4). The low enantiopurities are most likely to result from increasing reaction temperature to enable the sluggish desired borylation of the tertiary α-N-substituted organo-lithium species with less nucleophilicity due to the steric hindrance and the adjacent electron-withdrawing N-DG group. This problem could be circumvented by using less hindered and more reactive boron electrophile reagents to promote the borylation at low temperature with excellent enantiospecificity. It was surprisingly found that pinacolborane (HBpin) reacted readily with α-N-substituted organo-lithium species at −78° C. to give exclusively a borylated product in 99% yield and >99% ee (Table 1, entry 6). When directing group of Boc was replaced with CON($^i$Pr)$_2$, the corresponding borylated product was obtained in 80% yield and 97% ee (Table 1, entry 8).

After establishing the optimal reaction conditions, this novel enantiospecific borylation was applied to broad substrate scope. As can be seen in FIG. 2, various substituents of N-Boc protected amines, such as aryls with electron-withdrawing and electron-donating groups, alkyls with OMe, Br, and double bond, can undergo lithiation-borylation process smoothly affording a series of α-amino tertiary boronic esters in excellent yields and extremely high enantiopurities. Notably, this enantiospecific borylation was also tolerant of N-Boc protected tetrahydroisoquinoline providing 2j in 92% yield with >98% ee. In the case of 2c, the lithiation occurred at both positions adjacent to nitrogen of N-Boc due to OMe group acting as an additional directing group for lithiation at CH$_2$N-Boc, thus furnishing an approximate 1:2 ratio of CH$_2$/benzylic borylated products. Switching sBuLi to nBuLi as the base resulted in a completely regioselective deprotonation at the benzylic position and subsequent addition of HBpin provided 2c in 82% yield with complete stereocontrol (>99% ee). Standard reaction conditions to prepare compounds of FIG. 2 is: i) amine (0.25 mmol, 1.0 equiv), $^s$BuLi (1.2 equiv) at −78° C. for 0.5 h, ii) neat HBpin (1.5 equiv) at −78° C. for 2.5 h. [a] $^n$BuLi was replaced with $^s$BuLi. [b] TMEDA (1.5 equiv) was added.

Figure 2. Compounds made by enantiospecific borylation

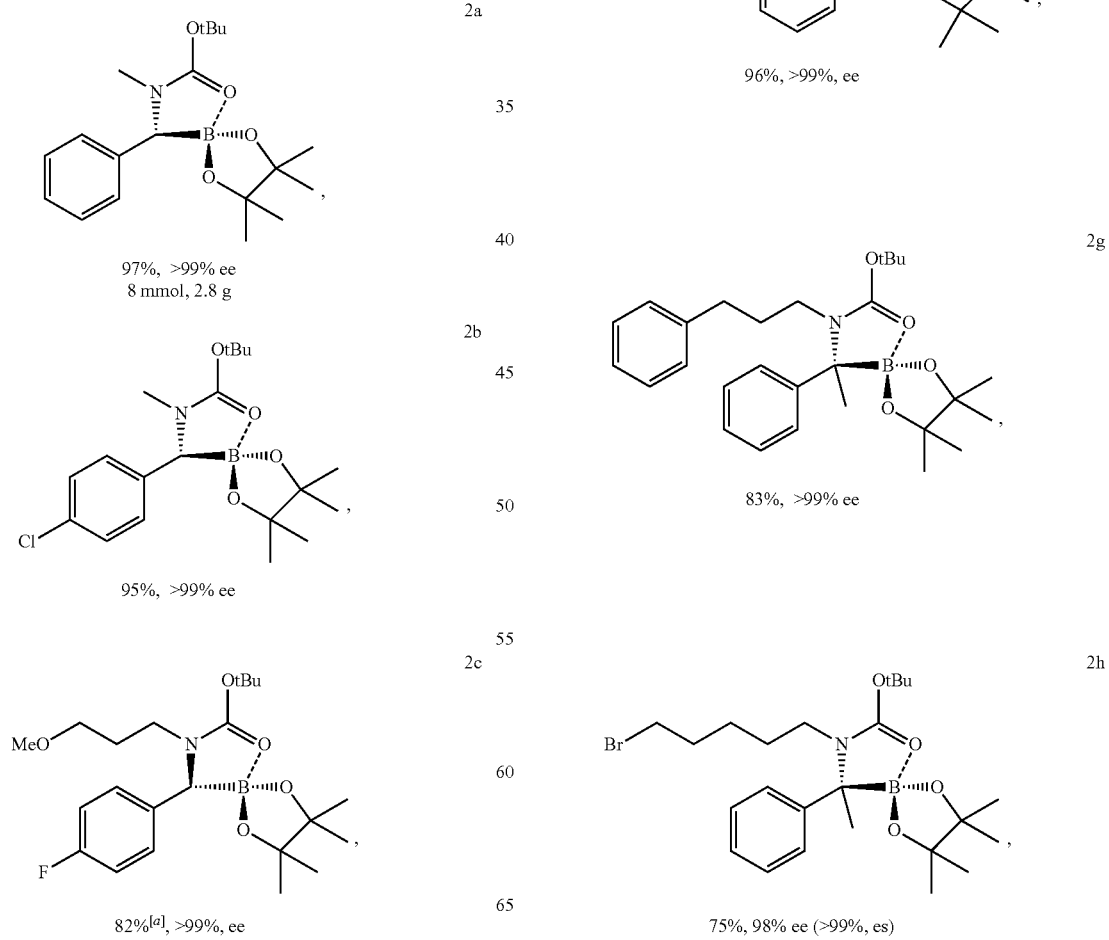

-continued

2i

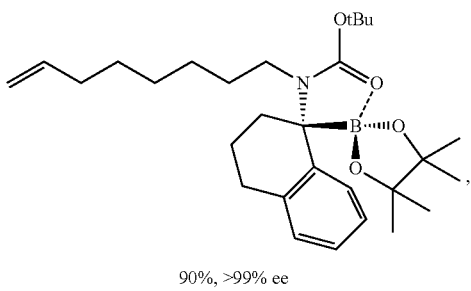

90%, >99% ee

2j

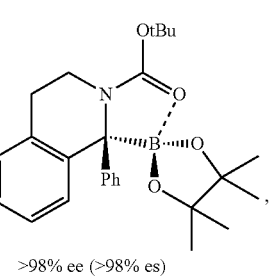

>98% ee (>98% es)

2k

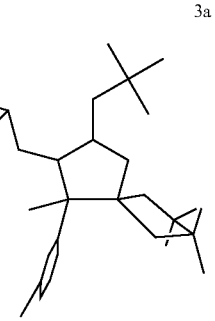

>98% ee (>98% es)

Figure 3. Compounds with multiple chiral centers made by enantiospecific borylation 3a

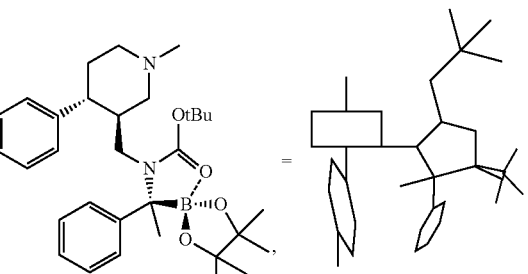

90%, dr > 50
5 mmol, 2.0 g

3b

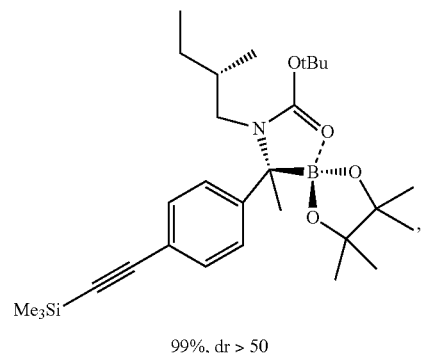

60%, dr > 50

3c

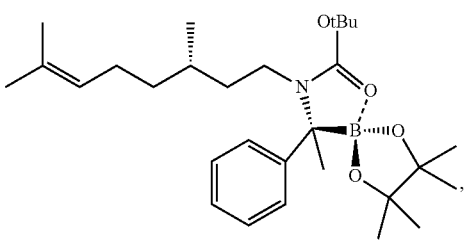

99%, dr > 50

3d

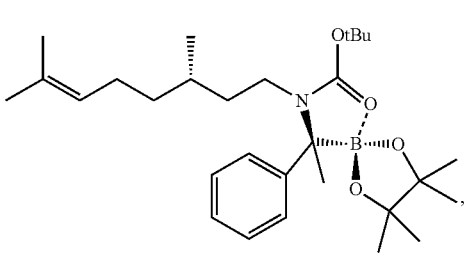

96%, dr > 50

3e

90%, dr > 50

The enantiospecific borylation process can be extended to the substrates with multiple chiral centers. As shown in FIG. 3, the reaction was tolerant of N-Boc protected amines containing various functional groups such as halides (3a, 3b), olefin (3d-e, 3h-k), alkyne (3c), OTBPDS, hetero-rings (3b, 3f, 3h). In these cases, the desired α-amino tertiary boronic esters 3 were obtained in good to excellent yields and, importantly, with complete retention of configuration, as determined by X-ray crystallographic analysis of 3a and 3b. The coordination between the boron atom and the carbonyl group of Boc makes such α-amino tertiary boronic esters highly stable. Notably, both enantiopure α-amino tertiary boronic esters (R,S)-3d and (S,S)-3e were prepared from the corresponding (R,S)— and (S,S)—N-Boc amines with complete enantiospecificity in 96% and 90% yield, respectively. This result indicates that there is no matched/mismatched issue here, which can often complicate reaction outcomes. The compounds illustrated in FIG. 3 are made with substantially same method as shown for FIG. 2.

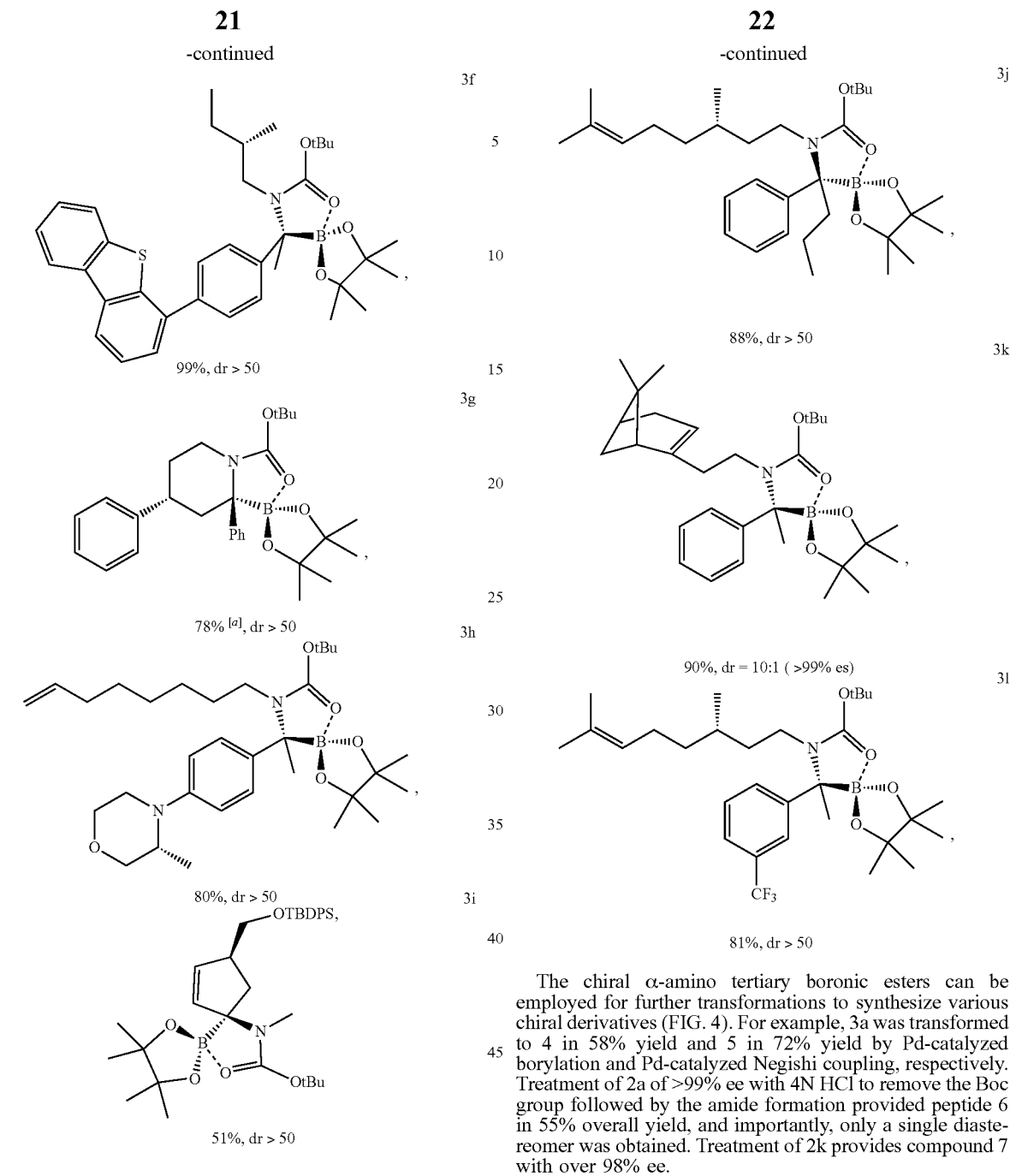

The chiral α-amino tertiary boronic esters can be employed for further transformations to synthesize various chiral derivatives (FIG. 4). For example, 3a was transformed to 4 in 58% yield and 5 in 72% yield by Pd-catalyzed borylation and Pd-catalyzed Negishi coupling, respectively. Treatment of 2a of >99% ee with 4N HCl to remove the Boc group followed by the amide formation provided peptide 6 in 55% overall yield, and importantly, only a single diastereomer was obtained. Treatment of 2k provides compound 7 with over 98% ee.

Figure 4 Derivatives synthesized by chiral α-amino tertiary boronic esters

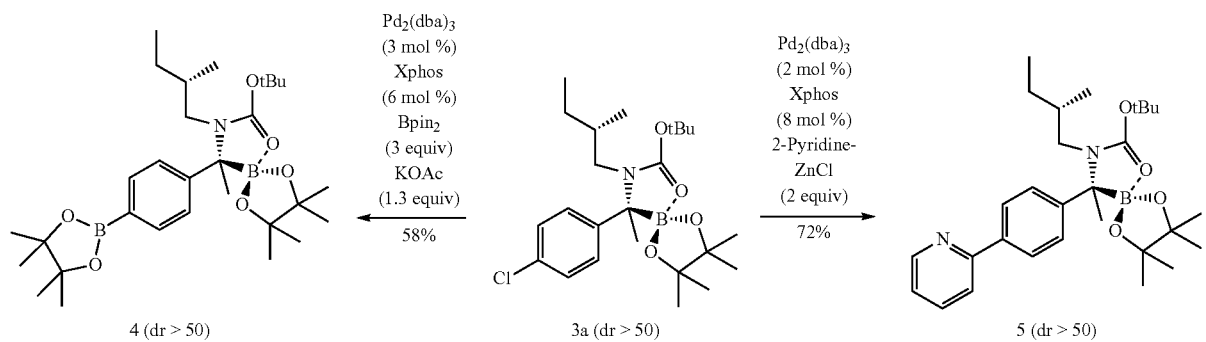

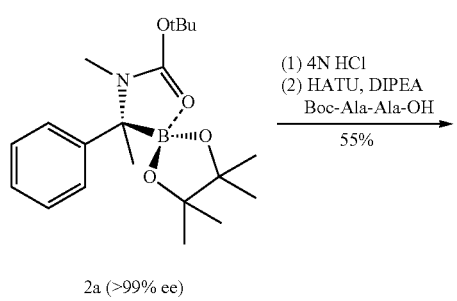

2a (>99% ee)

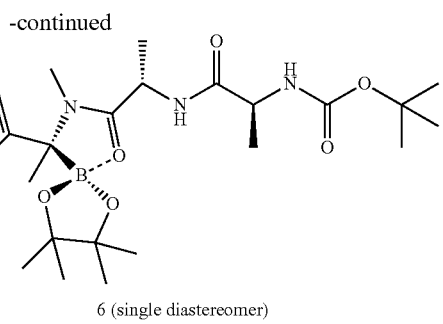

6 (single diastereomer)

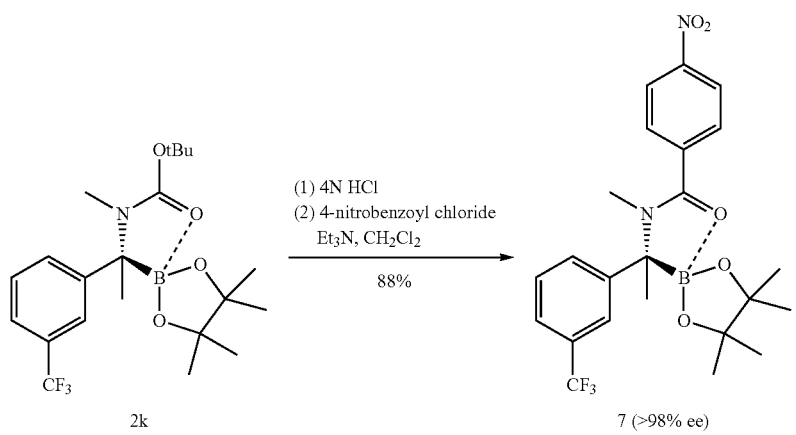

General Methods and Materials $^1$H NMR, $^{13}$C NMR, $^{11}$B NMR and $^{19}$F NMR spectra were recorded on Varian-Inova-300, Bruker-ARX-500 or Bruker Avance-III-800 spectrometer at ambient temperature. Multiplicities are indicated as s (singlet), d (doublet), t (triplet), m (multiplet) and br (broad). The high resolution mass measurements were obtained on a LTQ Orbitrap XL mass spectrometer (ThermoScientific Corp.) utilizing electrospray ionization (ESI) or on a MAT95XP (FinniganMAT Corp, Bremen Germany) using electron impact (EI) or chemical ionization (CI). HPLC was performed on a Agilent Infinite 1220 equipped with a UV wavelength detector using chiral stationary phases (Chiralpak IB-3, IA, AD-H, and Chiralcel OD-H, OJ-H 0.46 cm×25 cm) from Daicel. Analytical thin-layer chromatography (TLC) was performed on 0.25-mm Merck silica gel plates (60E-254). Flash chromatography was performed on silica gel Sorbtech Premium Rf.

The racemic products were prepared from the corresponding racemic substrates. THF was dried by distillation under argon from sodium/benzophenone. CH$_2$Cl$_2$ was dried by distillation under argon from CaH$_2$. Other commercially available solvents and reagents were of reagent grade and used without further purification, unless otherwise indicated. All other reagents and starting materials, unless otherwise noted, were purchased from commercial vendors and used without further purification.

General Procedure for Reaction Optimization

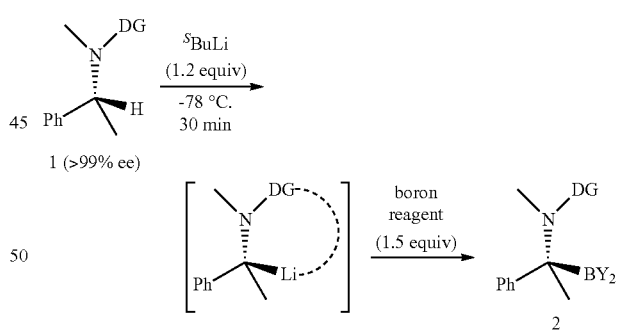

To a precooled solution of 1 (0.25 mmol, 1.0 equiv) in anhydrous solvent (2 mL) at −78° C. under argon was added s-BuLi (0.21 mL, 0.3 mmol, 1.4 M in cyclohexane, 1.2 equiv) dropwise via a syringe. The reaction mixture was stirred for 30 min at −78° C., and then neat HBPin (0.06 mL, 0.38 mmol, 1.5 equiv) was added dropwise via a syringe. After stirring for an additional 2.5 h at −78° C., 0.1 mL MeOH followed by 0.4 mL 1 N HCl aq was added and the mixture was warmed to room temperature slowly. 1 mL water was added the the mixture was extracted with diethyl ether and dried over Na$_2$SO$_4$. After filtration and concentration, the crude mixture was concentrated for analysis.

General Procedure a for the Enantiospecific Borylation

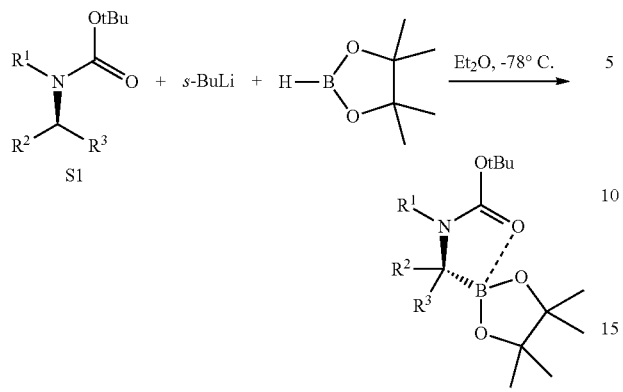

To a precooled solution of S1 (0.25 mmol, 1.0 equiv) in anhydrous Et₂H (2 mL) at −78° C. under Argon was added s-BuLi (0.21 mL, 0.3 mmol, 1.4 M in cyclohexane, 1.2 equiv) dropwise via a syringe. The reaction mixture was stirred for 30 min at −78° C., and then neat HBpin (0.06 mL, 0.38 mmol, 1.5 equiv) was added dropwise via a syringe. After stirring for an additional 2.5 h at −78° C., 0.1 mL MeOH followed by 0.4 mL 1 N HCl aq was added and the mixture was warmed to room temperature slowly. 1 mL water was added the the mixture was extracted with diethyl ether and dried over Na₂SO₄. After filtration and concentration, the crude mixture was purified by column chromatography (silica gel, ethyl acetate in hexanes) to afford the title products.

General Procedure B for the Enantiospecific Borylation

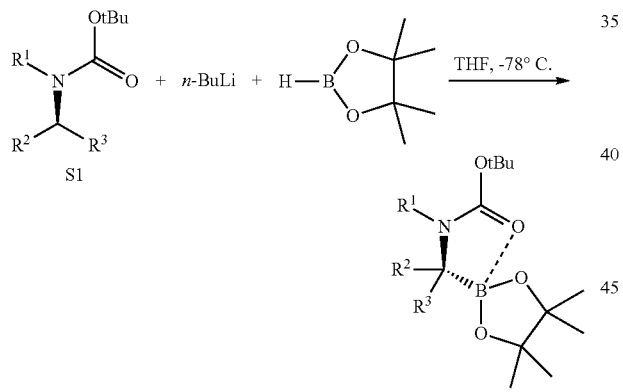

To a precooled solution of S1 (0.25 mmol, 1.0 equiv) in anhydrous THF (2 mL) at −78° C. under Argon was added n-BuLi (0.12 mL, 0.3 mmol, 2.5 M in hexanes, 1.2 equiv) dropwise via a syringe. The reaction mixture was stirred for 0.5~4 h at −78° C., and then neat HBpin (0.06 mL, 0.38 mmol, 1.5 equiv) was added dropwise via a syringe. After stirring for an additional 2.5 h at −78° C., 0.1 mL MeOH followed by 0.4 mL 1 N HCl aq was added and the mixture was warmed to room temperature slowly. 1 mL water was added the the mixture was extracted with diethyl ether and dried over Na₂SO₄. After filtration and concentration, the crude mixture was purified by column chromatography (silica gel, ethyl acetate in hexanes) to afford the title products.

General Procedure C for the Enantiospecific Borylation

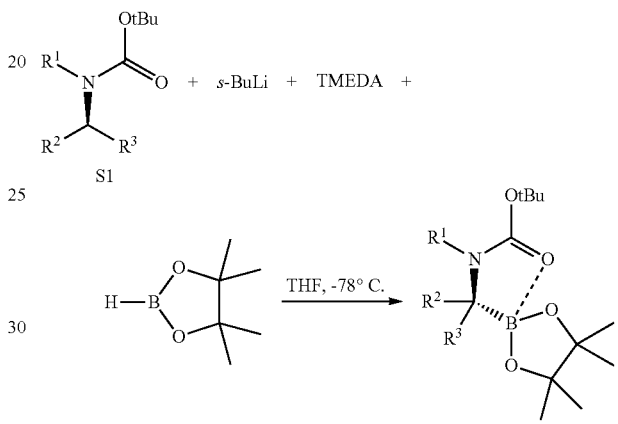

To a solution of TMEDA (0.25 mmol, 1.5 equiv) in anhydrous Et₂H (1 mL) at −78° C. under Ar was added s-BuLi (1.2 equiv) dropwise via a syringe. After stirring for 15 min, a precooled solution of S1 (1.0 equiv) in ETH (1 mL) was added dropwise. The reaction mixture was stirred for 4 h at −78° C., and then neat HBPin (1.5 equiv) was added dropwise. After stirring for an additional 2.5 h at −78° C., 0.1 mL MeOH followed by 0.3 mL 1 N HCl aq was added and the mixture was warmed to room temperature slowly. 1 mL water was added the the mixture was extracted with diethyl ether and dried over Na₂SO₄. After filtration and concentration, the crude mixture was purified by column chromatography (silica gel, ethyl acetate in hexanes) to afford the title products.

Characterization Data

| Compound name | Compound Structure | Data |
|---|---|---|
| tert-butyl(R)-methyl(1-phenyl-1-1-(4,4,5,5-tetramethyl-1,3,2-dioxaborolan-2-yl)ethyl)carbamate (2a) | | HRMS (ESI) calcd for $C_{20}H_{33}BNO_4^{+1}$ (M + 1): 362.2503. Found: 362.2495. |

-continued

| Compound name | Compound Structure | Data |
|---|---|---|
| (R)-1,1-diisopropyl-3-methyl-3-(1-phenyl-1-(4,4,5,5-tetramethyl-1,3,2-dioxaborolan-2-yl)ethyl)urea | | HRMS (ESI) calcd for C$_{22}$H$_{38}$BN$_2$O$_3$$^{+1}$ (M + 1): 389.2975. Found: 389.2970 |
| tert-butyl(R)-(1-(4-chlorophenyl)-1-(4,4,5,5-tetramethyl-1,3,2-dioxaborolan-2-yl)ethyl)(methyl)carbamate (2b) | | HRMS (ESI) calcd for C20H31BClKNO4$^{+1}$ (M + K): 434.1672. Found: 434.1660. |
| tert-butyl(S)-(1-(4-fluorophenyl)-1-(4,4,5,5-tetramethyl-1,3,2-dioxaborolan-2-yl)ethyl)(3-methoxypropyl)carbamate (2c) | | HRMS (ESI) calcd for C$_{23}$H$_{37}$BFKNO$_5$$^{+1}$ (M + K): 476.2386. Found: 476.2370. |
| tert-butyl(S)-(1-(4-methoxyphenyl)-1-(4,4,5,5-tetramethyl-1,3,2-dioxaborolan-2-yl)ethyl)(methyl)carbamate (2d) | | HRMS (APCI) calcd for C$_{21}$H$_{35}$BNO$_5$$^{+}$ (M+): 391.2639. Found: 391.2643. |
| tert-butyl(R)-pent-4-en-1-yl(1-phenyl-1-(4,4,5,5-tetramethyl-1,3,2-dioxaborolan-2-yl)ethyl)carbamate (2e) | | HRMS (ESI) calcd for C$_{24}$H$_{39}$BNO$_4$$^{+1}$ (M + 1): 416.2972. Found: 416.2962. |

| Compound name | Compound Structure | Data |
|---|---|---|
| tert-butyl(R)-oct-7-en-1-yl(1-phenyl-1-(4,4,5,5-tetramethyl-1,3,2-dioxaborolan-2-yl)ethyl)carbamate (2f) | | HRMS (ESI) calcd for $C_{27}H_{45}BNO_4^{+1}$ (M + 1): 458.3442. Found: 458.3445. |
| tert-butyl(R)-(1-phenyl-1-(4,4,5,5-tetramethyl-1,3,2-dioxaborolan-2-yl)ethyl)(3-phenylpropyl)carbamate (2g) | | HRMS (ESI) calcd for $C_{28}H_{41}BNO_4^{+1}$ (M + 1): 466.3129. Found: 466.3125. |
| tert-butyl(R)-(5-bromopentyl)(1-phenyl-1-(4,4,5,5-tetramethyl-1,3,2-dioxaborolan-2-yl)ethyl)carbamate (2h) | | HRMS (ESI) calcd for $C_{24}H_{40}BBrNO_4^{+1}$ (M + 1): 496.2234. Found: 496.2213. |
| tert-butyl(S)-oct-7-en-1-yl(1-(4,4,5,5-tetramethyl-1,3,2-dioxaborolan-2-yl)-1,2,3,4-tetrahydronaphthalen-1-yl)carbamate (2i) | | HRMS (ESI) calcd for $C_{29}H_{47}BNO_4^{+1}$ (M + 1): 484.3598. Found: 484.3592. |
| tert-butyl(S)-1-phenyl-1-(4,4,5,5-tetramethyl-1,3,2-dioxaborolan-2-yl)-3,4-dihydroisoquinoline-2(1H)-carboxylate (2j) | | (M+): 435.2690. Found: 435.2692. |
| tert-butyl(R)-methyl(1-(4,4,5,5-tetramethyl-1,3,2-dioxaborolan-2-yl)-1-(3-(trifluoromethyl)phenyl)ethyl)carbamate (2k) | | HRMS (ESI) calcd for $C_{21}H_{32}BF_3NO_4^{+1}$ (M + 1): 429.2407. Found 429.2404. |

-continued

| Compound name | Compound Structure | Data |
|---|---|---|
| tert-butyl((R)-1-(4-chlorophenyl)-1-(4,4,5,5-tetramethyl-1,3,2-dioxaborolan-2-yl)ethyl)((S)-2-methylbutyl)carbamate (3a) | | HRMS (ESI) calcd for $C_{24}H_{40}BClNO_4^{+1}$ (M + H): 452.2739. Found: 452.2719. |
| tert-butyl(((3S,4R)-4-(4-fluorophenyl)-1-methylpiperidin-3-yl)methyl)((R)-1-phenyl-1-(4,4,5,5-tetramethyl-1,3,2-dioxaborolan-2-yl)ethyl)carbamate (3b) | | HRMS (APCI) calcd for $C_{32}H_{46}BFN_2O_4^+$ (M+): 552.3644. Found: 552.3647. |
| tert-butyl((S)-2-methylbutyl)((R)-1-(4,4,5,5-tetramethyl-1,3,2-dioxaborolan-2-yl)-1-(4-((trimethylsilyl)ethynyl)phenyl)ethyl)carbamate (3c) | | HRMS (APCI) calcd for $C_{29}H_{48}BNO_4Si^+$ (M+): 513.3555. Found: 513.3551. |
| tert-butyl((S)-3,7-dimethyloct-6-en-1-yl)((R)-1-phenyl-1-(4,4,5,5-tetramethyl-1,3,2-dioxaborolan-2-yl)ethyl)carbamate (3d) | | HRMS (ESI) calcd for $C29H49BNO4^{+1}$ (M + 1): 486.3755. Found: 486.3744. |
| tert-butyl((S)-3,7-dimethyloct-6-en-1-yl)((S)-1-phenyl-1-(4,4,5,5-tetramethyl-1,3,2-dioxaborolan-2-yl)ethyl)carbamate (3e) | | HRMS (ESI) calcd for $C29H49BNO4^{+1}$ (M + 1): 486.3755. Found: 486.3744. |

-continued

| Compound name | Compound Structure | Data |
|---|---|---|
| tert-butyl((R)-1-(4-(dibenzo[b,d]thiophen-4-yl)phenyl)-1-(4,4,5,5-tetramethyl-1,3,2-dioxaborolan-2-yl)ethyl)((S)-2-methylbutyl)carbamate (3f) | | HRMS (APCI) calcd for $C_{36}H_{46}BNO_4S^+$ (M+): 599.3350. Found: 599.3354. |
| tert-butyl-2,4-diphenyl-2-(4,4,5,5-tetramethyl-1,3,2-dioxaborolan-2-yl)piperidine-1-carboxylate (3g) | | HRMS (ESI) calcd for $C_{28}H_{39}BNO_4^{+1}$(M + 1): 464.2972. Found: 464.2954. |
| tert-butyl((R)-1-(4-((R)-3-methylmorpholino)phenyl)-1-(4,4,5,5-tetramethyl-1,3,2-dioxaborolan-2-yl)ethyl)(oct-7-en-1-yl)carbamate (3h) | | HRMS (ESI) calcd for $C_{32}H_{54}BN_2O_5^{+1}$(M + 1): 557.4126. Found: 557.4115. |
| tert-butyl((1R/4S)-4-(((tert-butyldiphenylsilyl)oxy)methyl-1-(4,4,5,5-tetramethyl-1,3,2-dioxaborolan-2-yl)cyclopent-2-en-1-yl)(methyl)carbamate (3i) | | HRMS (APCI) calcd for $C_{34}H_{50}BNO_5Si^+$ (M+): 591.3660. Found: 591.3656. |
| tert-butyl((S)-3,7-dimethyloct-6-en-1-yl)((S)-1-phenyl-1-(4,4,5,5-tetramethyl-1,3,2-dioxaborolan-2-yl)butyl)carbamate (3j) | | HRMS (ESI) calcd for $C_{31}H_{53}BNO_4^{+1}$ (M + 1): 514.4068. Found: 514.4052. |

-continued

| Compound name | Compound Structure | Data |
|---|---|---|
| tert-butyl(2-((1R,5S)-6,6-dimethylbicyclo[3.1.1]hept-2-en-2-yl)ethyl)((R)-1-phenyl-1-(4,4,5,5-tetramethyl-1,3,2-dioxaborolan-2-yl)ethyl)carbamate (3k) | | HRMS (APCI) calcd for $C_{30}H_{46}BNO_4^+$ (M+): 495.3629. Found: 495.3635. |
| tert-butyl((S)-3,7-dimethyloct-6-en-1-yl)((R)-1-(4,4,5,5-tetramethyl-1,3,2-dioxaborolan-2-yl)-1-(3-(trifluoromethyl)phenyl)ethyl)carbamate (3l) | | HRMS (ESI) calcd for C30H47BF3NO4Na (M + Na):576.3448. Found: 576.3439. |

Transformations of Chiral α-Amino Tertiary Boronic Esters

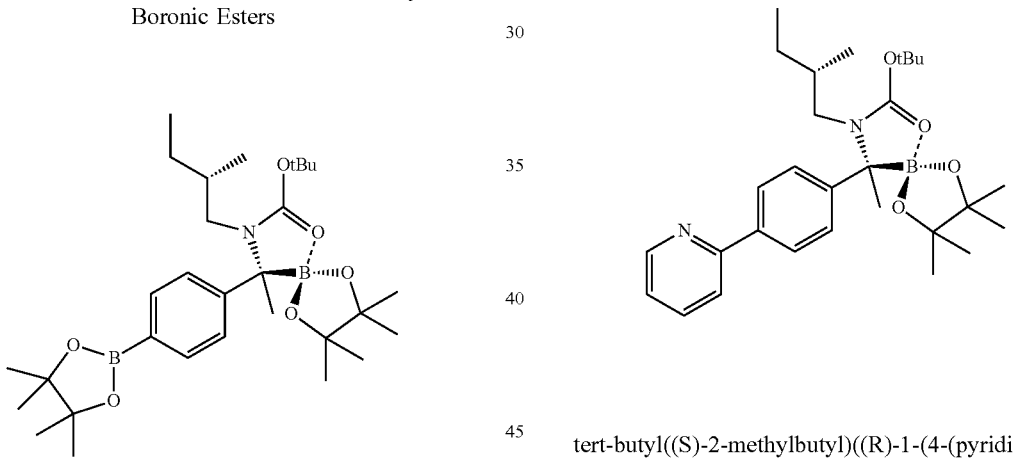

tert-butyl((S)-2-methylbutyl)((R)-1-(4,4,5,5-tetramethyl-1,3,2-dioxaborolan-2-yl)-1-(4-(4,4,5,5-tetramethyl-1,3,2-dioxaborolan-2-yl)phenyl)ethyl)carbamate (4)

An oven-dried flask was charged with $Pd_2dba_3$ (4.4 mg, 0.005 mmol), Xphos (4.6 mg, 0.01 mmol), bis(pinacolato)diboron (123 mg, 0.485 mmol), 3a (73 mg, 0.162 mmol), KOAc (73.6 mg, 0.75 mmol), and 1,4-dioxane (0.50 mL) under argon. The reaction mixture was heated to 80-90° C. for 18 h. The reaction mixture was allowed to cool to room temperature. The reaction solution was then filtered through a thin pad of celite (eluting with ethyl acetate) and the eluent was concentrated under reduced pressure. The title compound was purified via flash chromatography on silica gel (hexane:EtOAc=5:1) as a white solid (51 mg, 58%). HRMS (ESI) calcd for $C_{30}H_{52}B_2NO_6^{+1}$ (M+1): 544.3981. Found: 544.3965.

tert-butyl((S)-2-methylbutyl)((R)-1-(4-(pyridin-2-yl)phenyl)-1-(4,4,5,5-tetramethyl-1,3,2-dioxaborolan-2-yl)ethyl)carbamate (5)

An oven-dried flask was charged with $Pd_2dba_3$ (3 mg, 0.003 mmol), Xphos (6.3 mg, 0.013 mmol) in anhydrous THF (0.5 mL) under argon. The reaction mixture was heated to 45° C. 3a (75 mg, 0.166 mmol) was added and the reaction mixture was stirred for 15 min. 2-Pyridylzinc bromide (0.332 mmol, 1 mL in THF) was added and the reaction mixture was stirred overnight at 45° C. The reaction was then quenched with 0.6 mL $NaHCO_3$ and 0.6 mL $H_2O$. After separation, the aqueous layer was extracted 3 times with EtOAc. The combined organic layers were washed with $H_2O$ and brine, dried over $Na_2SO_4$, filtered, and concentrated by rotary evaporation. The title compound was purified via flash chromatography on silica gel (hexane:EtOAc=4:1) as a white solid (59 mg, 72%). HRMS (ESI) calcd for $C_{29}H_{43}BN_2O_4^{+1}$ (M+1): 495.3394. Found: 495.3372.

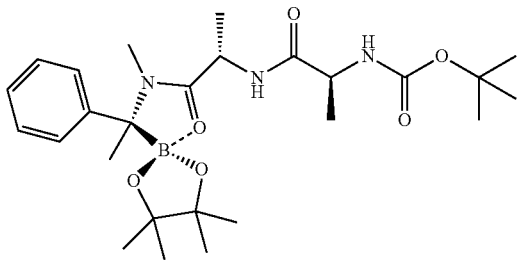

tert-butyl((S)-1-(((S)-1-(methyl((R)-1-phenyl-1-(4,4,5,5-tetramethyl-1,3,2-dioxaborolan-2-yl)ethyl)amino)-1-oxopropan-2-yl)amino)-1-oxopropan-2-yl)carbamate (6)

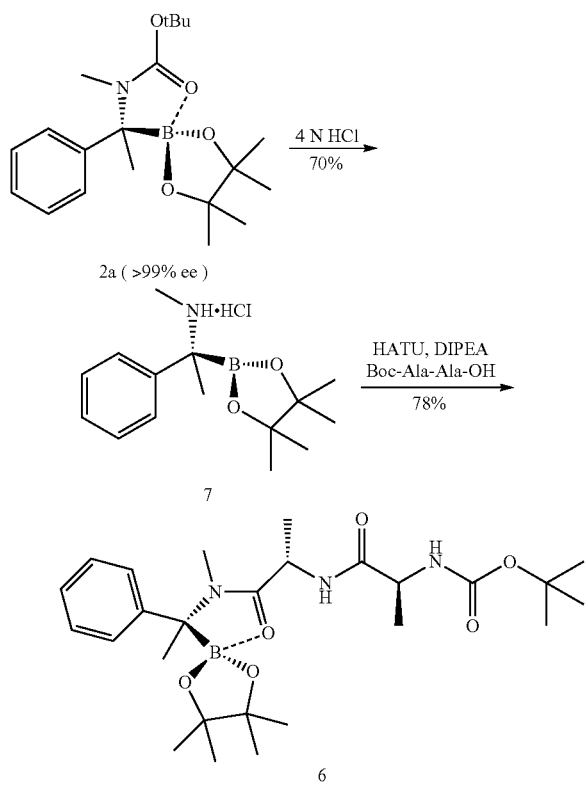

Compound 2a (361 mg, 1 mmol) was added 4 N HCl in 1,4-dioxane (2 mL) dropwise at 0° C. under argon. The reaction mixture was stirred at 0° C. for 15 h, and concentrated by rotary evaporation at room temperature to remove volatiles. Hexane (0.5 mL) was added, and the resulting solid was filtered to afford 7 (208 mg, 70%) as a white powder.

To a solution of 7 (30 mg, 0.1 mmol), Boc-Ala-Ala-OH (29 mg, 0.11 mmol) in DMF (0.5 mL) was added HATU (42 mg, 0.11 mmol). The reaction mixture was cooled to 0° C., and DIPEA (44 µL) was added dropwise. The reaction mixture was stirred at 0° C. for 5 h, and diluted with ethyl acetate (5 mL). The organic layers were washed with 0.1 N KHSO$_4$, NaHCO$_3$, and brine, dried over Na$_2$SO$_4$, filtered, and concentrated by rotary evaporation. The title compound was purified via flash chromatography on silica gel (hexane: EtOAc=2:1) as a white solid (39 mg, 78%). HRMS (ESI) calcd for $C_{26}H_{43}BN_3O_6^{+1}$ (M+1): 504.3245. Found: 504.3246.

Synthesis of the N-Boc-Protected Chiral Amines

General Procedure of Method A

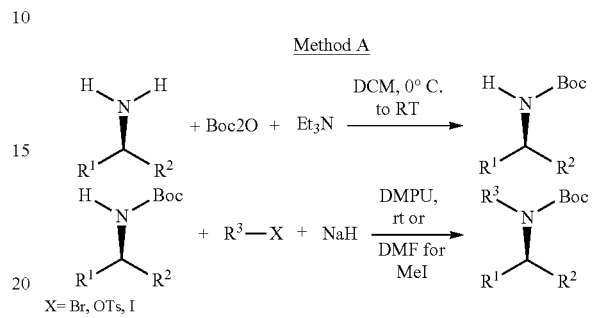

Preparation of N-Boc Protected Amines

A solution of amine (1.0 equiv) and triethyl amine (2.0 equiv) in DCM (1.0 M) was cooled to 0° C., then di-tert-butyl dicarbonate (1.05 equiv) was added. After stirring overnight, the reaction was quenched by water, extracted with ethyl acetate. The combined organic phase was dried over Na2SO4, concentrated, and the residue was purified by flash chromatography.

Alkylation of N-Boc Protected Amines

N-Boc amines (1.0 equiv) obtained in the last step was dissolved in DMPU (1.7 M) or DMF (0.5 M when MeI was used) at rt, and NaH (2.0 equiv) was added. After stirring at rt for 30 min, alkylating reagents (1.5 equiv or MeI 2.0 equiv) was added and stirred overnight. The reaction was quenched by carefully addition of EtOAc and brine, the organic phase was washed with brine and dried over Na$_2$SO$_4$, concentrated, and the residue was purified by flash chromatography.

General Procedure of Method B

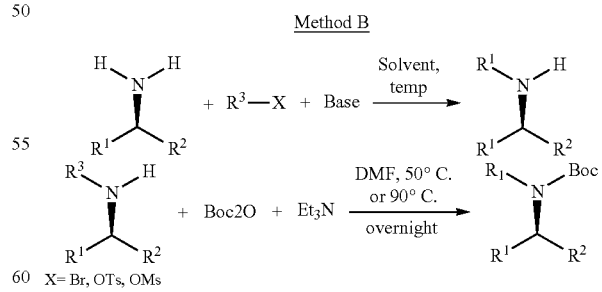

Preparation of N-Monoalkylated Amines

Chiral amine (1.0-3.0 equiv), alkylating reagents (1.0 equiv) and DIPEA (1.0 equiv) were dissolved in 5 mL DMF at rt. After stirring overnight, the reaction was quenched by water, extracted with ethyl acetate. The combined organic phase was dried over Na2SO4, concentrated, and the residue was purified by flash chromatography.

Preparation of N-Boc Protected Amines

The N-alkylated amine (1.0 equiv) was mixed with di-tert-butyl dicarbonate (4.0 equiv) and potassium carbonate (0.6 equiv) in DMF (1.0 M), and the mixture was heated to 50° C. or 90° C. overnight. The crude product was purified using column chromatography.

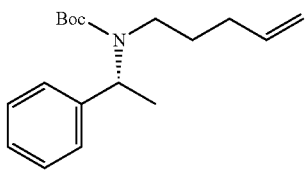 [SMILES: C=CCCCN(C(=O)OC(C)(C)C)[C@H](C)c1ccccc1]

tert-butyl (R)-pent-4-en-1-yl(1-phenylethyl)carbamate was prepared according to method A on 5 mmol scale by using 5-bromopent-1-ene, and the product was isolated by flash chromatography (hexane:EtOAc=40:1 to 30:1) as a colorless liquid (1.25 g, 86%). HRMS (ESI) calcd for $C_{18}H_{28}NO_2^{+1}$ (M+1): 290.2120. Found: 290.2117.

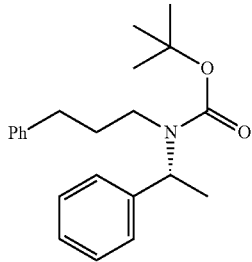 [SMILES: C[C@H](c1ccccc1)N(CCCc1ccccc1)C(=O)OC(C)(C)C]

tert-butyl (R)-(1-phenylethyl)(3-phenylpropyl)carbamate was prepared according to method A on 1.5 mmol scale by using (3-bromopropyl)benzene, and the product was isolated by flash chromatography (hexane:EtOAc=30:1) as a colorless liquid (0.4 g, 88%). $^1$H NMR (two rotamers, 800 MHz, Chloroform-d) δ 7.33 (t, J=7.6 Hz, 2H), 7.29-7.25 (m, 5H), 7.18 (t, J=7.4 Hz, 1H), 7.08 (d, J=7.6 Hz, 2H), 5.56 (brs, 0.6H), 5.17 (brs, 0.4H), 3.01-2.90 (m, 2H), 2.46 (br, 2H), 1.75-1.65 (m, 2H), 1.51 (d, J=7.2 Hz, 3H), 1.47 (s, 9H).

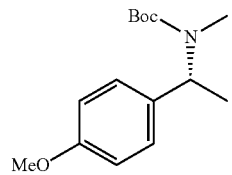

tert-butyl (R)-(1-(4-methoxyphenyl)ethyl)(methyl)carbamate was prepared according to method A on 5 mmol scale by using MeI in DMF, and the product was isolated by flash chromatography (hexane:EtOAc=7:1) as a colorless liquid (1.2 g, 90%). $^1$H NMR (800 MHz, Chloroform-d) δ 7.34-7.32 (m, 2H), 7.28-7.24 (m, 3H), 5.57 (brs, 0.49H), 5.37 (brs, 0.39H), 2.58 (s, 3H), 1.50-1.49 (m, 13H).

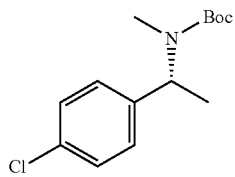 [SMILES: C[C@H](c1ccc(Cl)cc1)N(C)C(=O)OC(C)(C)C]

tert-butyl (R)-(1-(4-chlorophenyl)ethyl)(methyl)carbamate was prepared according to method A on 2 mmol scale by using MeI in DMF, and the product was isolated by flash chromatography (hexane:EtOAc=30:1) as a colorless liquid (0.5 g, 83%). $^1$H NMR (800 MHz, Chloroform-d) δ 7.33 (t, J=7.7 Hz, 2H), 7.27-7.24 (m, 3H), 5.57 (brs, 0.53H), 5.37 (brs, 0.45H), 2.58 (s, 3H), 1.50-1.49 (m, 12H).

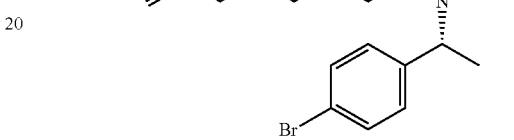

tert-butyl (R)-(1-(4-bromophenyl)ethyl)(but-3-en-1-yl)carbamate

Prepared following method A on 7 mmol scale by using 8-bromooct-1-ene. The product was isolated by flash chromatography (hexane:EtOAc=10:1) as a colorless oil (2.49 g, 87%). $^1$H NMR (800 MHz, Chloroform-d) δ 7.43 (d, J=8.0 Hz, 2H), 7.16 (d, J=8.0 Hz, 2H), 5.78 (dq, J=16.9, 7.2 Hz, 1H), 5.43 (brs, 1H), 4.97 (d, J=17.1 Hz, 1H), 4.92 (d, J=10.2 Hz, 1H), 2.86 (brs, 2H), 2.00 (q, J=7.4 Hz, 2H), 1.50 (d, J=7.1 Hz, 3H), 1.44 (s, 9H), 1.34-1.29 (m, 3H), 1.24-1.19 (m, 3H), 1.14 (s, 2H).

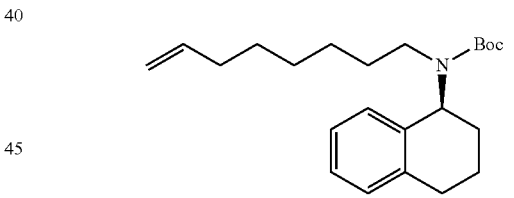

tert-butyl (S)-oct-7-en-1-yl(1,2,3,4-tetrahydronaphthalen-1-yl)carbamate

Prepared following method A on 1.3 mmol scale by using 8-bromo° Ct-1-ene, and the product was isolated by flash chromatography (hexane:EtOAc=30:1) as a colorless liquid (1.3 g, 73%). HRMS (ESI) calcd for $C23H36NO2^{+1}$ (M+1): 358.2746. Found: 358.2740.

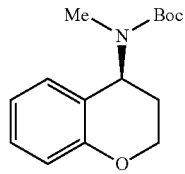 [SMILES: CN(C(=O)OC(C)(C)C)[C@H]1CCOc2ccccc21]

tert-butyl (S)-chroman-4-yl(methyl)carbamate

Prepared following method A on 2.1 mmol scale by using MeI in DMF, and the product was isolated by flash chromatography (hexane:EtOAc=20:1) as a colorless liquid (0.5 g, 94%). HRMS (ESI) calcd for $C_{15}H_{21}NO_3^{+1}$ (M+1): 264.1594. Found: 264.1596.

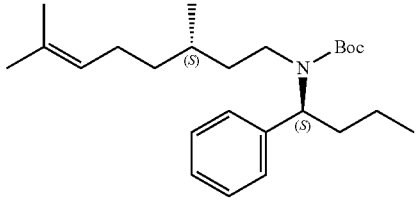

tert-butyl ((S)-3,7-dimethyloct-6-en-1-yl)((S)-1-phenylbutyl)carbamate (S)-3,7-dimethyl-N—((R)-1-phenylethyl)oct-6-en-1-amine was prepared by mixing amine (9 mmol, 3 equiv), (S)-(+)-Citronellyl bromide (1.0 equiv) and DIPEA (1.0 equiv) in 5 mL DMF at rt. After stirring overnight, the reaction was quenched by water, extracted with ethyl acetate. The combined organic phase was dried over $Na_2SO_4$, concentrated, and the residue was purified by flash chromatography (hexane:EtOAc=4:1) to afford the product as a slightly yellow oil (700 mg, 90%).

tert-butyl ((S)-3,7-dimethyloct-6-en-1-yl)((R)-1-phenylethyl)carbamate was prepared on 1.5 mmol scale and the product was isolated by flash chromatography (hexane:EtOAc=30:1) as a colorless liquid (500 mg, 93%). $^1$H NMR (800 MHz, Chloroform-d) δ 7.33-7.28 (m, 4H), 7.24 (t, J=7.2 Hz, 1H), 5.53 (brs, 1H), 5.04 (t, J=7.2 Hz, 1H), 3.03 (brs, 1H), 2.79 (brs, 1H), 1.96-1.90 (m, 1H), 1.89-1.84 (m, 1H), 1.67 (s, 3H), 1.58 (s, 3H), 1.53 (d, J=6.8 Hz, 3H), 1.54-1.51 (m, 1H), 1.47 (s, 9H), 1.34-1.21 (m, 3H), 1.11-1.04 (m, 1H), 0.77 (s, 3H).

tert-butyl ((S)-3,7-dimethyloct-6-en-1-yl)((S)-1-phenylethyl)carbamate

Prepared following method A on 1.5 mmol scale in DMPU, (S)-(+)-Citronellyl bromide (1.0 equiv) was added dropwise to this mixture. The reaction mixture was allowed to warm up to RT and stirred overnight. The product was isolated by flash chromatography (hexane:EtOAc=10:1) as a colorless liquid (230 mg, 43%). $^1$H NMR (800 MHz, Chloroform-d) δ 7.35-7.31 (m, 4H), 7.27-7.25 (m, 1H), 5.55 (brs, 0.64H), 5.12 (brs, 0.38H), 5.05 (ddt, J=8.6, 5.4, 1.5 Hz, 1H), 2.97-2.87 (m, 2H), 1.89-1.84 (m, 2H), 1.69 (s, 3H), 1.59 (s, 3H), 1.54 (d, J=6.9 Hz, 3H), 1.49 (s, 9H), 1.37-1.17 (m, 4H), 1.09-1.04 (m, 1H), 0.82 (d, J=4.5 Hz, 3H).

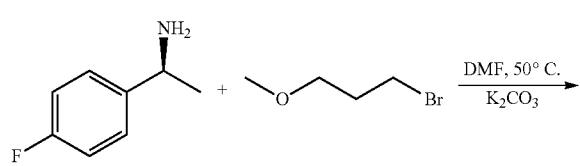

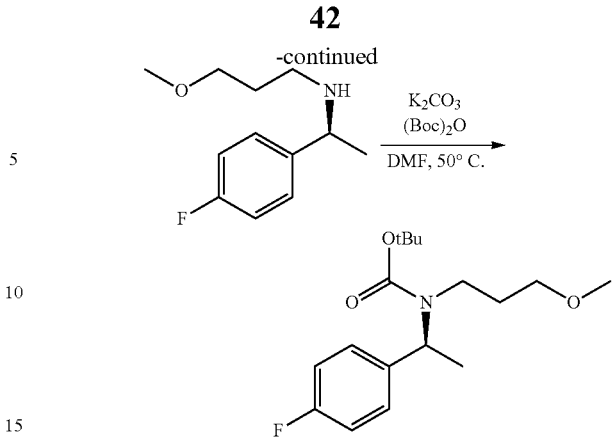

(S)—N-(1-(4-fluorophenyl)ethyl)-3-methoxypropan-1-amine was prepared by mixing amine (7.2 mmol, 1 equiv), 1-bromo-3-methoxypropane (1.0 equiv) and potassium carbonate (2.0 equiv) in 5 mL DMF and then mixture was put into 50° C. oil bath. After stirring overnight, the reaction was quenched by water, extracted with ethyl acetate. The combined organic phase was dried over $Na_2SO_4$, concentrated, and the residue was purified by flash chromatography (hexane:EtOAc=1:5 with 2% TEA) to afford the product as a slightly yellow oil (438 mg, 29%). $^1$H NMR (300 MHz, Chloroform-d) δ 7.28-7.22 (m, 2H), 7.02-6.94 (m, 2H), 3.72 (q, J=6.6 Hz, 1H), 3.44-3.33 (m, 2H), 3.28 (s, 3H), 2.61-2.41 (m, 2H), 1.75-1.66 (m, 2H), 1.57 (brs, 1H), 1.30 (d, J=6.6 Hz, 3H). $^{19}$F NMR (282 MHz, $CDCl_3$) δ −118.00 (m, 1F).

tert-butyl (S)-(1-(4-fluorophenyl)ethyl)(3-methoxypropyl)carbamate was prepared on 2.1 mmol scale at 50° C., and the product was isolated by flash chromatography (hexane:EtOAc=20:1) as a colorless liquid (510 mg, 79%). $^1$H NMR (800 MHz, Chloroform-d) δ 7.23-7.19 (m, 2H), 6.97-6.92 (m, 2H), 5.45 (brs, 0.62H), 5.12 (brs, 0.36H), 3.26-2.79 (m, 7H), 1.66-1.39 (m, 14H). $^{13}$C NMR (201 MHz, $CDCl_3$) δ 162.38, 161.16, 155.63, 137.79, 128.59, 114.89, 79.51, 70.58, 58.34, 52.18, 40.69, 30.14, 28.41, 17.37. $^{19}$F NMR (282 MHz, $CDCl_3$) δ −117.95, −117.98, −118.00, −118.03, −118.05. HRMS (ESI) calcd for $C_{17}H_{27}FNO_3^{+1}$ (M+1): 312.1975. Found: 312.1969.

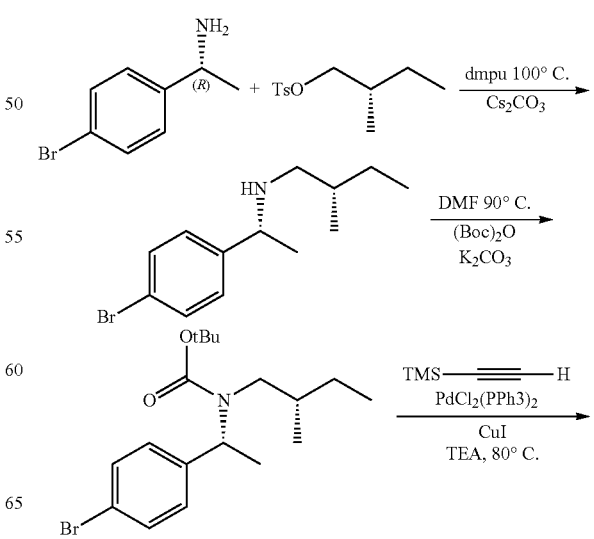

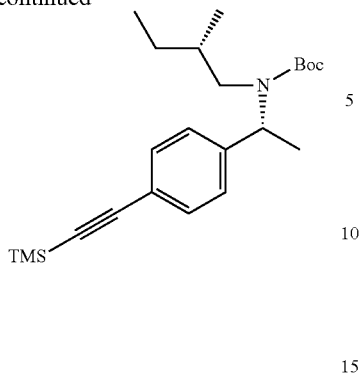

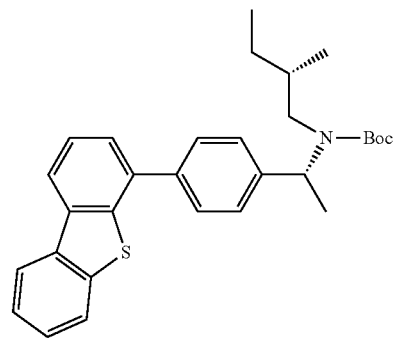 [SMILES: CC[C@H](C)CN(C(=O)OC(C)(C)C)[C@H](C)c1ccc(-c2cccc3c2sc2ccccc23)cc1]

tert-butyl((R)-1-(4-(dibenzo[b,d]thiophen-4-yl)phenyl)ethyl)((S)-2-methylbutyl)carbamate

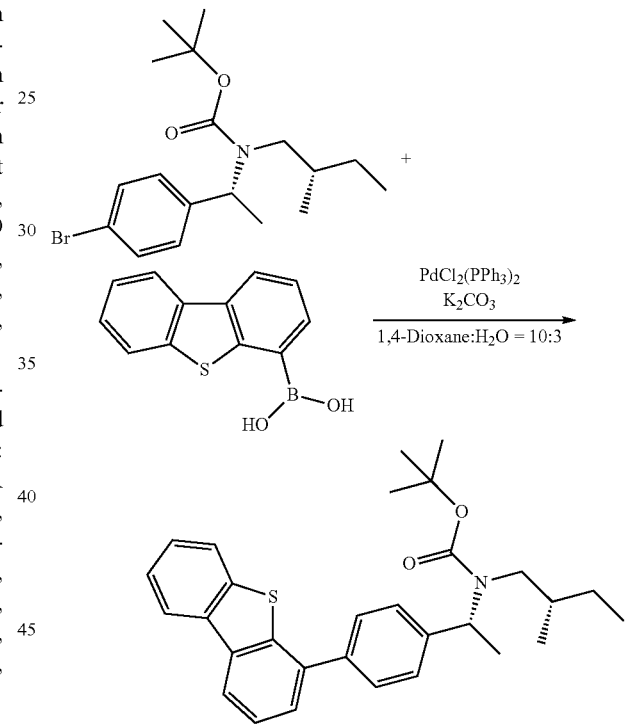

(S)—N—((R)-1-(4-bromophenyl)ethyl)-2-methylbutan-1-amine was prepared by mixing amine (11.0 mmol, 1.1 equiv), (S)-2-methylbutyl 4-methylbenzenesulfonate (1.0 equiv) and Cs$_2$CO$_3$ (2.0 equiv) in 5 mL DMPU and then mixture was put into 100° C. oil bath. After stirring overnight, the reaction was quenched by water, extracted with ethyl acetate. The combined organic phase was dried over Na$_2$SO$_4$, concentrated, and the residue was purified by flash chromatography (hexane:EtOAc=5:1) to afford the product as a colorless oil (1.6 g, 58%). $^1$H NMR (800 MHz, Chloroform-d) δ 7.44-7.42 (m, 2H), 7.21-7.19 (m, 2H), 3.69 (q, J=6.6 Hz, 1H), 2.42 (dd, J=11.5, 5.4 Hz, 1H), 2.14 (dd, J=11.5, 7.6 Hz, 1H), 1.49-1.43 (m, 1H), 1.38-1.32 (m, 1H), 1.30 (d, J=6.7 Hz, 3H), 1.13-1.08 (m, 1H), 0.87 (d, J=6.7 Hz, 3H), 0.84 (t, J=7.5 Hz, 3H).

tert-butyl ((R)-1-(4-bromophenyl)ethyl)((S)-2-methylbutyl)carbamate was prepared on 1.2 mmol scale at 90° C., and the product was isolated by flash chromatography (hexane:EtOAc=20:1) as a colorless liquid (300 mg, 68%). $^1$H NMR (800 MHz, Chloroform-d) δ 7.43-7.41 (m, 2H), 7.16 (d, J=8.1 Hz, 2H), 5.27 (brs, 0.56H), 4.85 (brs, 0.43H), 3.01-2.77 (m, 2H), 1.54 (d, J=7.2 Hz, 3H), 1.49-1.28 (m, 11H), 0.99 (brs, 1H), 0.83-0.79 (m, 6H). $^{13}$C NMR (two rotamers, 201 MHz, CDCl$_3$) δ 156.15, 141.64, 131.20, 128.67, 120.65, 79.61, (54.83, 53.64), (52.03, 50.33), 34.64, 28.39, 27.20, 17.83, 17.11, 11.51.

tert-butyl((S)-2-methylbutyl)((R)-1-(4-((trimethylsilyl)ethynyl)phenyl)ethyl)carbamate was prepared according to the literature on 1.0 mmol scale (Decarboxylative Alkynyl Termination of Palladium-Catalyzed Catellani Reaction: A Facile Synthesis of a-Alkynyl Anilines via ortho C—H Amination and Alkynylation Org. Lett., 2015, 17 (9), pp 2222-2225). The product was isolated by flash chromatography (hexane:EtOAc=13:1) to afford the product as a colorless liquid (97 mg, 25%). $^1$H NMR (800 MHz, Chloroform-d) δ 7.41-7.39 (m, 2H), 7.21 (d, J=7.9 Hz, 2H), 5.34 (brs, 0.48H), 4.84 (brs, 0.46H), 3.01-2.74 (m, 2H), 1.55 (d, J=7.2 Hz, 3H), 1.38-1.28 (m, 11H), 0.98-0.78 (m, 7H), 0.24 (s, 9H). $^{13}$C NMR (two rotamers, 201 MHz, CDCl$_3$) δ 156.20, 143.15, 131.77, 126.77, 121.52, 104.99, 93.93, 79.55, (55.22, 53.61), (52.58, 50.32), 34.58, 28.38, 27.20, 17.73, 17.09, 11.48, −0.03. HRMS (ESI) calcd for C$_{23}$H$_{38}$NO$_2$Si$^{+1}$ (M+1): 388.2672. Found: 388.2666.

A mixture of 4-dibenzothienylboronic acid (273 mg, 1.2 mmol, 1.2 equiv), PdCl$_2$(PPh$_3$)$_2$ (70 mg, 0.1 mmol, 0.1 equiv) and potassium carbonate (415 mg, 3.0 mmol, 3.0 equiv) in 1,4-dioxane:water (10 mL:3 mL) was stirred at rt under Ar for 5 min. Then tert-butyl ((R)-1-(4-bromophenyl)ethyl)((S)-2-methylbutyl)carbamate (370 mg, 1.0 mmol, 1.0 equiv) was added and the mixture was heated to 55° C. overnight, before the volatiles were removed under reduced pressure. The residue was extracted with ether and the organic phase was washed with brine for three times, dried over Na$_2$SO$_4$, concentrated, and the residue was purified by flash chromatography (hexane:EtOAc=50:1) to afford the product as a thick oil (150 mg, 63%). $^1$H NMR (800 MHz, Chloroform-d) δ 8.22-8.17 (m, 2H), 7.88-7.85 (m, 1H), 7.75-7.73 (m, 2H), 7.58 (t, J=7.5 Hz, 1H), 7.52-7.47 (m, 5H), 5.56 (brs, 0.52H), 5.03 (brs, 0.47H), 3.16-2.90 (m, 2H), 1.69 (d, J=7.2 Hz, 3H), 1.59-1.39 (m, 11H), 1.14-1.03 (m, 1H), 0.92-0.86 (m, 2Me, 6H). $^{13}$C NMR (201 MHz, CDCl$_3$) δ 156.36, 142.37, 139.60, 139.18, 138.61, 136.76, 136.25, 135.82, 128.07, 127.43, 126.84, 126.80, 125.11, 124.39, 122.62, 121.75, 120.42, 79.57, 55.36, 53.85, 52.48, 50.33, 34.76, 28.51, 27.30, 17.92, 17.23, 11.64. HRMS (ESI) calcd for $C_{30}H_{36}NO_2S^{+1}$ (M+1): 474.2467. Found: 474.4774.

J=7.1 Hz, 2H), 6.93 (t, J=8.6 Hz, 2H), 5.45 (brs, 0.58H), 4.95 (brs, 0.46H), 3.13-2.75 (m, 3H), 2.46 (dd, J=14.8, 3.2 Hz, 1H), 2.28 (s, 3H), 2.10-2.06 (m, 1H), 1.99-1.77 (m, 3H), 1.73-1.71 (m, 1H), 1.45-1.37 (m, 13H). $^{13}$C NMR (two rotamers, 201 MHz, Chloroform-d) δ 161.43 (d, J=244.1 Hz), 156.26, (141.68, 141.10), 139.74, 128.89, 128.09, 127.41, 127.00, 115.24 (d, J=21.2 Hz). 79.74, 60.69, 56.12, (54.90, 53.77), 46.63, 46.23, (45.61, 45.06), 43.15, 34.60, 28.42, 17.58. $^{19}$F NMR (282 MHz, CDCl$_3$) δ −118.84 (s, 1F). HRMS (ESI) calcd for $C_{26}H_{35}FN_2O_2^{+1}$ (M+1): 427.2755. Found: 427.2758.

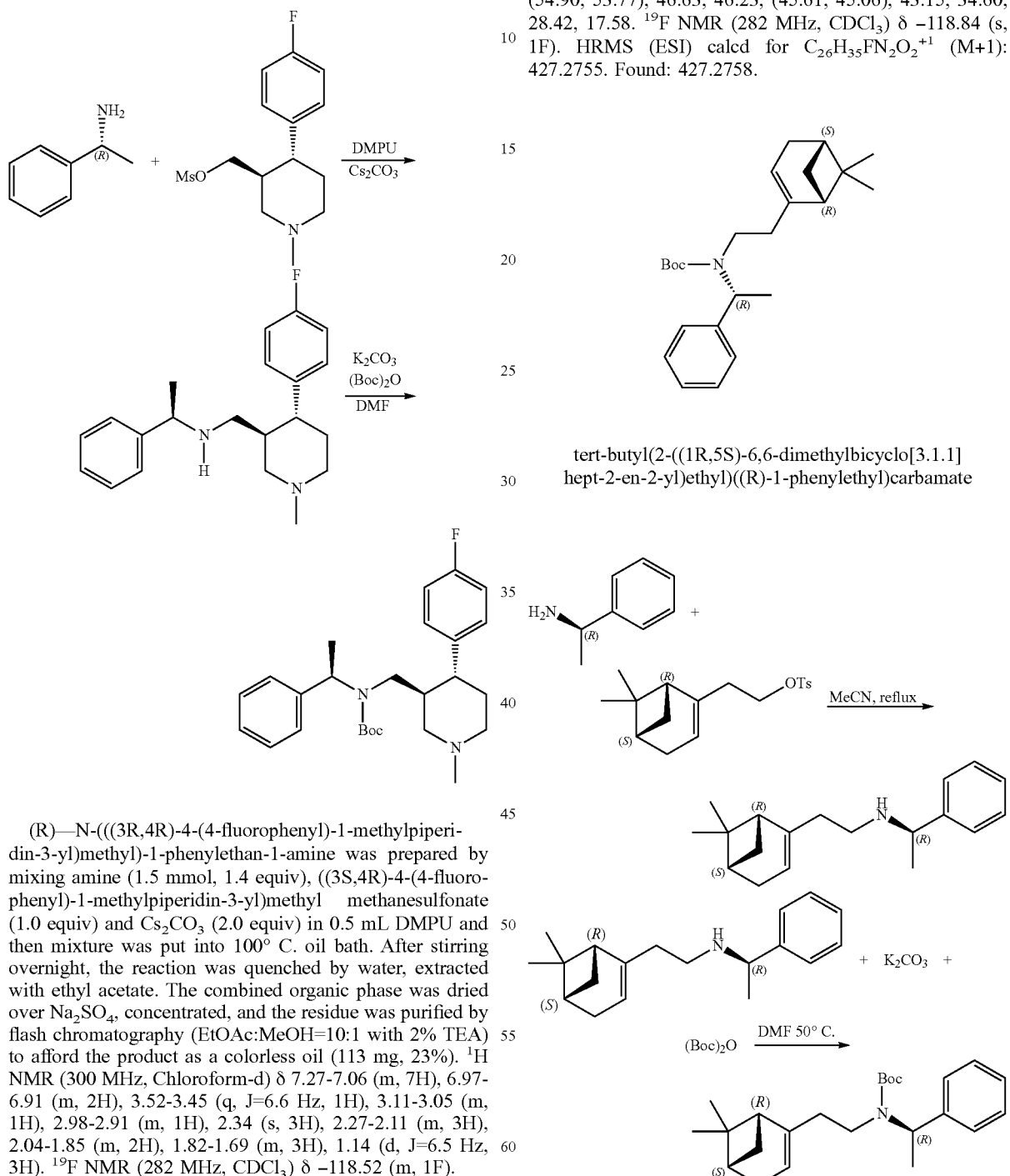

tert-butyl(2-((1R,5S)-6,6-dimethylbicyclo[3.1.1]
hept-2-en-2-yl)ethyl)((R)-1-phenylethyl)carbamate (R)—N-(((3R,4R)-4-(4-fluorophenyl)-1-methylpiperidin-3-yl)methyl)-1-phenylethan-1-amine was prepared by mixing amine (1.5 mmol, 1.4 equiv), ((3S,4R)-4-(4-fluorophenyl)-1-methylpiperidin-3-yl)methyl methanesulfonate (1.0 equiv) and Cs$_2$CO$_3$ (2.0 equiv) in 0.5 mL DMPU and then mixture was put into 100° C. oil bath. After stirring overnight, the reaction was quenched by water, extracted with ethyl acetate. The combined organic phase was dried over Na$_2$SO$_4$, concentrated, and the residue was purified by flash chromatography (EtOAc:MeOH=10:1 with 2% TEA) to afford the product as a colorless oil (113 mg, 23%). $^1$H NMR (300 MHz, Chloroform-d) δ 7.27-7.06 (m, 7H), 6.97-6.91 (m, 2H), 3.52-3.45 (q, J=6.6 Hz, 1H), 3.11-3.05 (m, 1H), 2.98-2.91 (m, 1H), 2.34 (s, 3H), 2.27-2.11 (m, 3H), 2.04-1.85 (m, 2H), 1.82-1.69 (m, 3H), 1.14 (d, J=6.5 Hz, 3H). $^{19}$F NMR (282 MHz, CDCl$_3$) δ −118.52 (m, 1F).

tert-butyl(((3S,4R)-4-(4-fluorophenyl)-1-methylpiperidin-3-yl)methyl)((R)-1-phenylethyl)carbamate was prepared on 0.3 mmol scale at 90° C., and the product was isolated by flash chromatography (EtOAc:MeOH=10:1) as a white solid (100 mg, 68%). $^1$H NMR (800 MHz, Chloroform-d) δ 7.18-7.14 (m, 3H), 7.05 (t, J=6.6 Hz, 2H), 7.00 (d, 2-((1R,5S)-6,6-dimethylbicyclo[3.1.1]hept-2-en-2-yl)-N—((R)-1-phenylethyl)ethan-1-amine was prepared by refluxing amine (4.0 mmol, 2.0 equiv) with 2-((1R,5S)-6,6-dimethylbicyclo[3.1.1]hept-2-en-2-yl)ethyl 4-methylbenzenesulfonate (1.0 equiv) in MeCN overnight, and the product was isolated by flash chromatography as a thick oil (404 mg, 75%).

tert-butyl(2-((1R,5S)-6,6-dimethylbicyclo[3.1.1]hept-2-en-2-yl)ethyl)((R)-1-phenylethyl)carbamate was prepared on 0.7 mmol scale at 50° C., and the product was isolated by flash chromatography (hexane:EtOAc=50:1) as a thick oil (78 mg, 30%). $^1$H NMR (800 MHz, Chloroform-d) δ 7.34-7.24 (m, 5H), 5.54-5.07 (m, 2H), 3.13-2.82 (m, 2H), 2.29 (dt, J=8.6, 5.6 Hz, 1H), 2.19-1.77 (m, 6H), 1.53-1.47 (m, 12H), 1.22 (s, 3H), 1.05 (d, J=8.5 Hz, 1H), 0.74 (s, 3H). $^{13}$C NMR (two rotamers, 201 MHz, CDCl$_3$) δ (155.79, 155.30), 145.88, (142.33, 141.75), 128.22, 127.30, 127.02, 117.38, 79.42, (54.36, 52.61), 45.59, (43.22, 41.81), 40.65, 37.86, (37.76, 36.78), 31.55, 31.24, 28.53, 26.22, 21.17, (17.84, 17.19). HRMS (ESI) calcd for $C_{24}H_{35}NO_2^{+1}$ (M+1): 370.2741. Found: 370.2744.

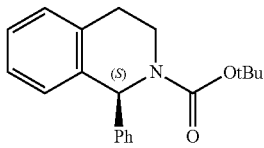

tert-butyl (S)-1-phenyl-3,4-dihydroisoquinoline-2(1H)-carboxylate was prepared according to literature.

In conclusion, a new and highly efficient enantiospecific borylation route to various chiral α-amino tertiary boronic esters has been successfully developed. This route employs N-Boc protected amines which are lithiated at −78° C. to generate configurationally stable organolithium species followed by the treatment with HBpin to undergo enantiospecific borylation, enabling the synthesis of a series of enantiopure (>99% ee) α-amino tertiary boronic esters with the formation of a new stereogenic C—B bond. Importantly, universally excellent enantiospecificity was observed. The current method is also applicable for gram-scale synthesis of 2a and 3a without erosion of enantiospecificity. The α-amino tertiary boronic esters can be further functionalized to provide various chiral compounds which hold a great potential for peptidomimetics of boron-based bioactive molecules.

Those skilled in the art will recognize that numerous modifications can be made to the specific implementations described above. The implementations should not be limited to the particular limitations described. Other implementations may be possible.

We claim:

1. A method of making a chiral α-amino tertiary boronic compound of formula (I) or any pharmaceutically acceptable salt or isomer thereof, wherein the method comprises:
   a) converting a compound of formula (III) to a compound of formula (II) by reacting the compound of formula (III) with a lithiation reagent LiR$^7$;
   b) converting the compound of formula (II) to the compound of formula (I) by reacting the compound of formula (II) with a boron reagent B(OR$^4$)(OR$^5$)R$^6$,

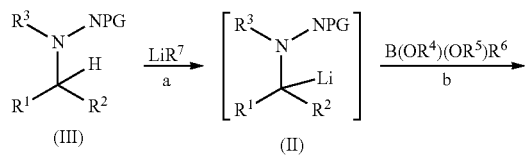

-continued

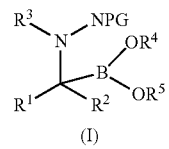

wherein:
R$^1$, R$^2$ and R$^3$ are each individually non-hydrogen groups, and wherein R$^1$ and R$^2$ are different groups;
R$^4$ and R$^5$ are each individually H, R$^4$ and R$^5$ are each individually straight or branched optionally substituted C$_1$-C$_{12}$ alkyl group, wherein R$^4$ and R$^5$ may form a cyclic ring, or (OR$^4$),(OR$^5$), and B together form a fused ring

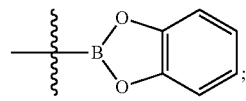 [SMILES: *B1Oc2ccccc2O1]

R$^6$ is H, a straight or a branched optionally substituted C$_1$-C$_{12}$ alkoxyl group;
R$^7$ is an optionally substituted aryl, or a straight or branched optionally substituted C$_1$-C$_{12}$ alkyl group, wherein the C$_1$-C$_{12}$ alkyl is optionally interspersed at one or more intervals with one or more heteroatom selected from the group consisting of N and Si; and
NPG is a nitrogen protecting group.

2. The method of claim 1, wherein R$^1$, R$^2$ and R$^3$ are each individually different straight or branched optionally substituted C$_1$-C$_{12}$ alkyl group, optionally substituted C$_3$-C$_{12}$ cycloalkyl group, optionally substituted C$_3$-C$_{12}$ cycloalkenyl group, straight or branched optionally substituted C$_2$-C$_{12}$ alkenyl group, straight or branched optionally substituted C$_2$-C$_{12}$ alkynyl group, optionally substituted C$_6$-C$_{12}$ aryl, optionally substituted C$_6$-C$_{12}$ heteroaryl with one or more O, N, or S, wherein R$^1$ and R$^2$, R$^1$ and R$^3$, or R$^2$ and R$^3$ may jointly form an optionally substituted C$_3$-C$_8$ saturated or non-saturated ring, or form an optionally substituted C$_3$-C$_8$ saturated or non-saturated heterocyclic ring.

3. The method of claim 1, wherein B(OR$^4$)(OR$^5$)R$^6$ is B(OMe)$_3$, catecholborane, or 4,4,5,5-tetramethyl-1,3,2-dioxaborolane (HBpin), 2-methoxy-4,4,5,5-tetramethyl-1,3,2-dioxaborolane (MeO-Bpin).

4. The method of claim 1, wherein the NPG is a nitrogen protecting group that has a carbonyl (C=O) group, a sulfinyl group ((S=O), or a sulfonyl (—SO$_2$)— group directly attached to the nitrogen to be protected.

5. The method of claim 1, wherein the NPG is tert-butyloxycarbonyl (Boc) or CON($^i$Pr)$_2$.

6. The method of claim 1, wherein LiR$^7$ is lithium diisopropylamide (LDA), Lithium bis(trimethylsilyl)amide (LHMDS), or butyl lithium with straight or branched butyl group.

7. The method of claim 1, wherein the method is capable of providing the compound of formula (I) an ee value of 80-100%.

8. The method of claim 1, wherein the method is capable of providing the compound of formula (I) an ee value of 90-100%.

9. The method of claim 1, wherein NPG is a BOC or CON($^i$Pr)$_2$ group, R$^7$ is straight or branched butyl group, B(OR$^4$)(OR$^5$)R$^6$ is B(OMe)$_3$ or 4,4,5,5-tetramethyl-1,3,2-dioxaborolane.

10. A compound of formula (I), wherein the compound is made by the method of claim 1.

11. A compound of formula (I),

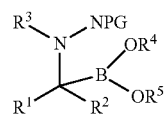
(I)

or any pharmaceutically acceptable salt, stereoisomer, diastereomer, or enantiomer thereof, wherein:

$R^1$, $R^2$ and $R^3$ are each individually non-hydrogen groups, and wherein $R^1$ and $R^2$ are different groups, wherein $R^1$ and $R^2$, $R^1$ and $R^3$, or $R^2$ and $R^3$ may jointly form an optionally substituted $C_3$-$C_5$ saturated or non-saturated ring, or form an optionally substituted $C_3$-$C_5$ saturated or non-saturated heterocyclic ring;

$R^4$ and $R^5$ are each individually H, $R^4$ and $R^5$ are each individually straight or branched optionally substituted $C_1$-$C_{12}$ alkyl group, wherein $R^4$ and $R^5$ may jointly form a cyclic ring, or ($OR^4$),($OR^5$), and B together form a fused ring

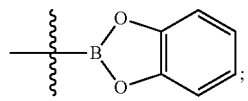 [SMILES: *B1Oc2ccccc2O1]
;

and

NPG is a nitrogen protecting group.

12. The compound of claim 11, wherein $R^1$, $R^2$ and $R^3$ are each individually different straight or branched optionally substituted $C_1$-$C_{12}$ alkyl group, optionally substituted $C_3$-$C_{12}$ cycloalkyl group, optionally substituted $C_3$-$C_{12}$ cycloalkenyl group, straight or branched optionally substituted $C_2$-$C_{12}$ alkenyl group, straight or branched optionally substituted $C_2$-$C_{12}$ alkynyl group, optionally substituted $C_6$-$C_{12}$ aryl, optionally substituted $C_6$-$C_{12}$ heteroaryl with one or more O, N, or S.

13. The compound of claim 11, wherein the compound has a formula (I') or formula (I"):

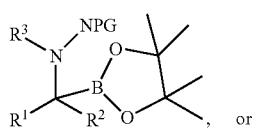
(I')

, or

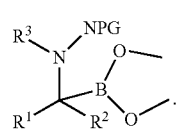
(I")

14. The compound of claim 11, wherein the NPG is a nitrogen protecting group that has a carbonyl (C=O) group, a sulfinyl group ((S=O), or a sulfonyl (—SO$_2$)— group directly attached to the nitrogen to be protected.

15. The compound of claim 11, wherein the NPG is tert-butyloxycarbonyl (Boc) or CON($^i$Pr)$_2$.

16. The compound of claim 11, wherein the compound has an ee value of 90-100%.

17. The compound of claim 11, wherein the compound is selected from the group consisting of:

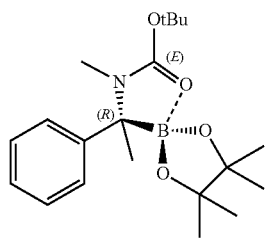
2a

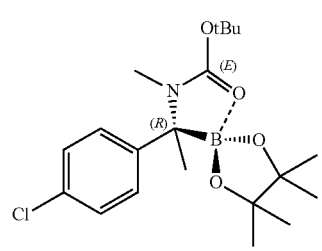
2b

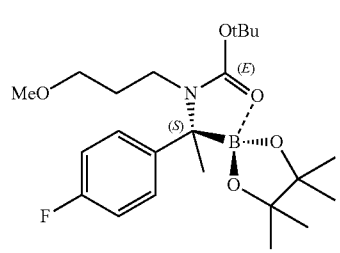
2c

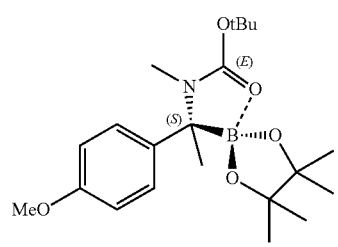
2d

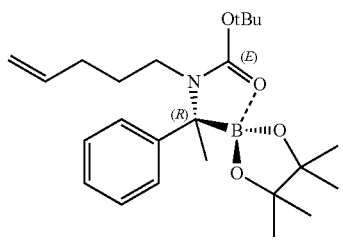
2e

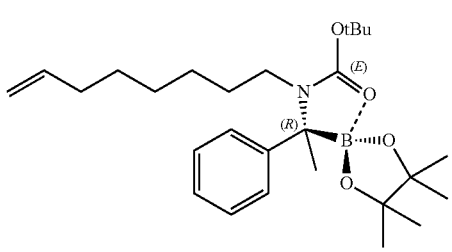
2f

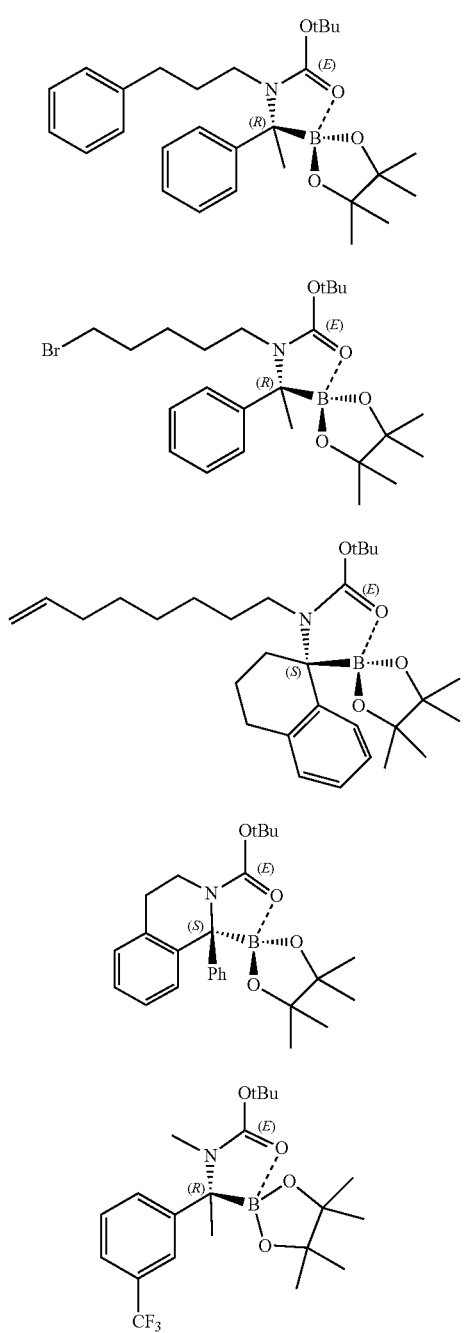
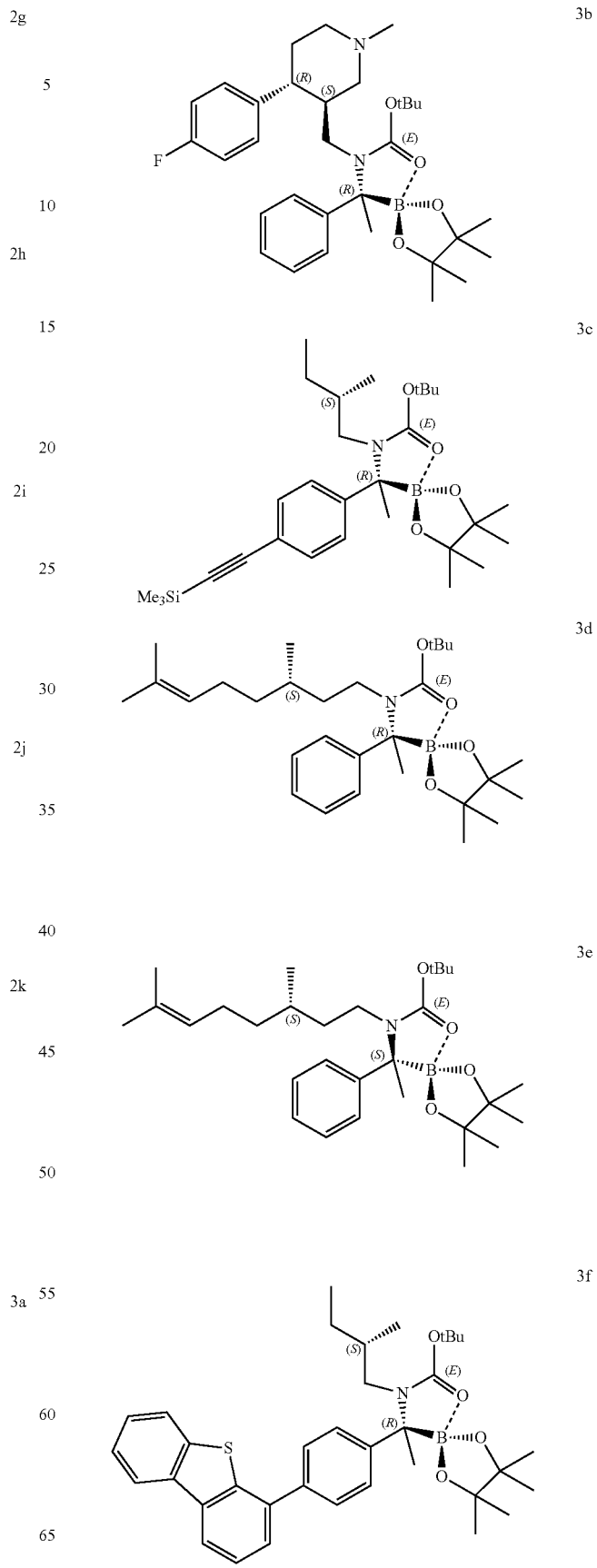

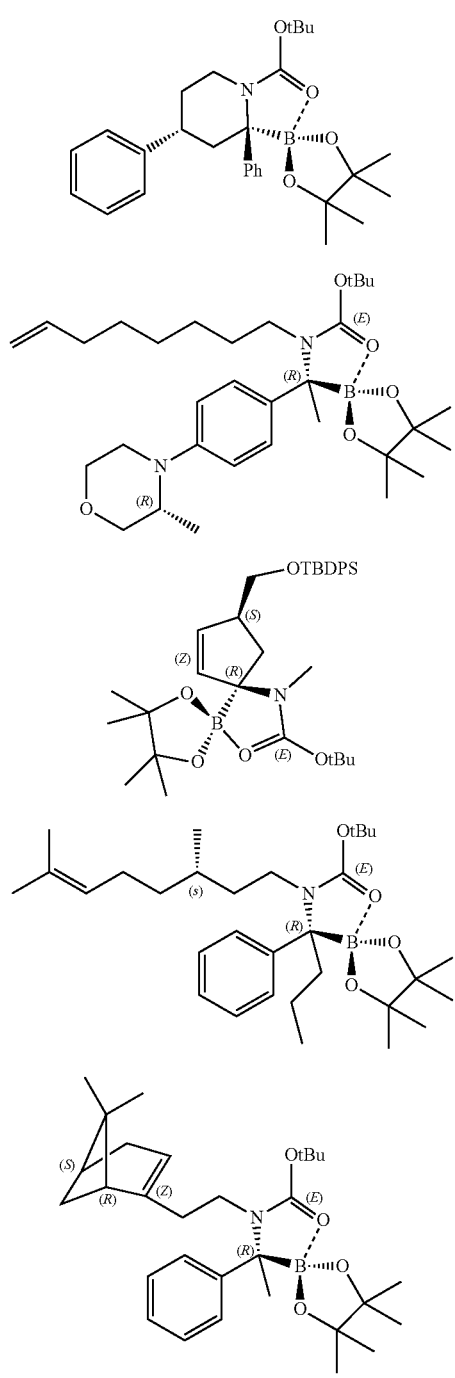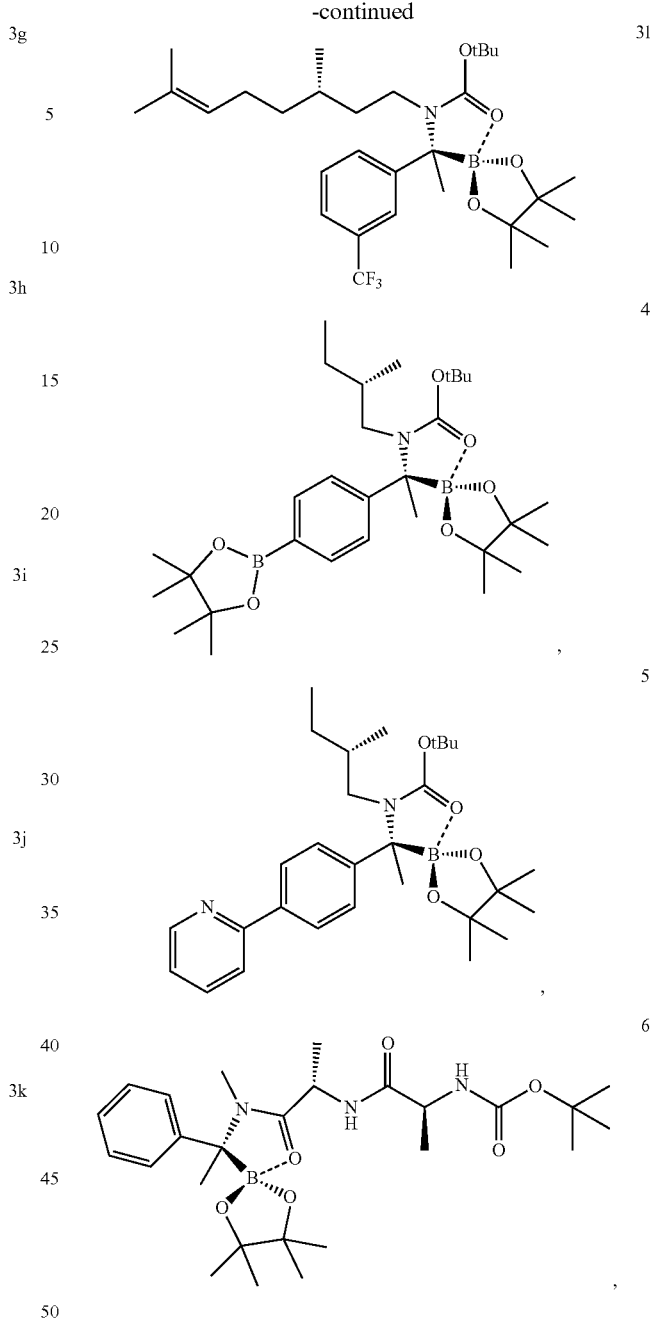
any pharmaceutically acceptable salt, stereoisomer, diastereomer, enantiomer, and corresponding boronic acid thereof.
* * * * *